(12) United States Patent
Dankberg et al.

(10) Patent No.: US 11,010,270 B2
(45) Date of Patent: May 18, 2021

(54) SELF-ORGANIZED STORAGE NODES FOR DISTRIBUTED DELIVERY NETWORK

(71) Applicant: ViaSat Inc., Carlsbad, CA (US)

(72) Inventors: Mark Dankberg, Encinitas, CA (US); Nirmalkumar Velayudhan, San Marcos, CA (US); Joshua Righetti, Carlsbad, CA (US)

(73) Assignee: Viasat, Inc., Carlsbad, CA (US)

( * ) Notice: Subject to any disclaimer, the term of this patent is extended or adjusted under 35 U.S.C. 154(b) by 100 days.

(21) Appl. No.: 15/951,728

(22) Filed: Apr. 12, 2018

(65) Prior Publication Data

US 2018/0239683 A1  Aug. 23, 2018

Related U.S. Application Data

(63) Continuation of application No. 14/928,167, filed on Oct. 30, 2015, now Pat. No. 9,965,369.

(60) Provisional application No. 62/153,823, filed on Apr. 28, 2015.

(51) Int. Cl.
*G06F 11/30* (2006.01)
*G06F 11/20* (2006.01)
*H04L 29/08* (2006.01)
*H04L 12/911* (2013.01)
(Continued)

(52) U.S. Cl.
CPC ...... *G06F 11/3034* (2013.01); *G06F 11/1666* (2013.01); *G06F 11/2023* (2013.01); *G06F 11/2028* (2013.01); *G06F 11/2069* (2013.01); *G06F 11/3006* (2013.01); *G06F 11/3058* (2013.01); *H04L 43/08* (2013.01); *H04L 47/746* (2013.01); *H04L 67/1097* (2013.01); *H04L 67/12* (2013.01); *H04L 67/2842* (2013.01); *G06F 2201/805* (2013.01); *H04L 67/1095* (2013.01)

(58) Field of Classification Search
CPC ............ G06F 11/2023; G06F 11/2028; G06F 11/3006; G06F 11/3034; G06F 11/3058; G06F 11/2069; G06F 11/1666; H04L 43/08; H04L 47/746; H04L 67/1097; H04L 67/2842
See application file for complete search history.

(56) References Cited

U.S. PATENT DOCUMENTS

| 6,223,252 B1 | 4/2001 | Bandera et al. |
| 7,694,188 B2 | 4/2010 | Rahuraman |
| 8,824,261 B1 | 9/2014 | Miller et al. |

(Continued)

*Primary Examiner* — Kamini B Patel
(74) *Attorney, Agent, or Firm* — Holland & Hart LLP

(57) ABSTRACT

A distributed delivery network for capacity enhancement of a communication link shared by multiple communication devices for network access service. The distributed delivery network may include one or more distributed storage devices, some of which may include at least one rotating disk storage device, a network interface, and one or more environmental sensors. Each distributed storage device may monitor data from the environmental sensor(s) and transition between an active state where messages are stored in or retrieved from the storage device, and a standby state where access is suppressed. The distributed storage devices may self-organize control operations for the distributed delivery network including message storage and retrieval and redundancy of messages, which may be determined by frequency of requests for the messages.

20 Claims, 16 Drawing Sheets

(51) Int. Cl.
*G06F 11/16* (2006.01)
*H04L 12/26* (2006.01)

(56) References Cited

U.S. PATENT DOCUMENTS

| | | | |
|---|---|---|---|
| 8,832,234 B1 | 9/2014 | Brooker et al. | |
| 8,949,533 B2 | 2/2015 | Puthalath et al. | |
| 9,276,900 B1 | 3/2016 | Daud et al. | |
| 9,317,381 B2 | 4/2016 | Suzuki et al. | |
| 9,436,564 B1* | 9/2016 | van der Goot | G06F 11/00 |
| 9,529,772 B1 | 12/2016 | Shankaran | |
| 9,860,317 B1 | 1/2018 | Gupta | |
| 9,965,369 B2* | 5/2018 | Dankberg | G06F 11/2069 |
| 10,263,690 B2* | 4/2019 | Treesh | H04B 7/18508 |
| 10,651,923 B2* | 5/2020 | Treesh | H04B 7/18541 |
| 2003/0135609 A1 | 7/2003 | Carlson et al. | |
| 2004/0255206 A1 | 12/2004 | Sato et al. | |
| 2005/0188248 A1 | 8/2005 | O'Brien et al. | |
| 2006/0224852 A1 | 10/2006 | Kottomtharayil et al. | |
| 2008/0189578 A1 | 8/2008 | Raghuraman et al. | |
| 2009/0125671 A1 | 5/2009 | Flynn et al. | |
| 2010/0142544 A1 | 6/2010 | Chapel et al. | |
| 2010/0185894 A1* | 7/2010 | Herta | G06F 11/2048 714/4.1 |
| 2010/0292982 A1 | 11/2010 | Dube et al. | |
| 2011/0072206 A1 | 3/2011 | Ross et al. | |
| 2011/0182196 A1 | 7/2011 | Yunoki et al. | |
| 2011/0307451 A1* | 12/2011 | El Haddi | G06F 16/164 707/673 |
| 2012/0254342 A1* | 10/2012 | Evans | H04L 67/1097 709/214 |
| 2013/0145209 A1 | 6/2013 | Saito | |
| 2014/0078882 A1 | 3/2014 | Maltz | |
| 2014/0095457 A1 | 4/2014 | Quan | |
| 2014/0225769 A1* | 8/2014 | Akcasu | G01S 19/03 342/357.4 |
| 2014/0325647 A1 | 10/2014 | Knapp et al. | |
| 2015/0149528 A1* | 5/2015 | Miluzzo | H04L 67/1095 709/203 |
| 2015/0172169 A1 | 6/2015 | DeCusatis et al. | |
| 2015/0172183 A1 | 6/2015 | DeCusatis et al. | |
| 2015/0212740 A1 | 7/2015 | Dewey et al. | |
| 2015/0220398 A1 | 8/2015 | Schirripa | |
| 2015/0312820 A1 | 10/2015 | Yang | |
| 2015/0327024 A1 | 11/2015 | Yang | |
| 2016/0094356 A1 | 3/2016 | Xiang | |
| 2016/0127235 A1* | 5/2016 | Zourzouvillys | H04L 67/10 709/217 |
| 2016/0249405 A1 | 8/2016 | Koc et al. | |
| 2016/0301610 A1 | 10/2016 | Amit et al. | |
| 2016/0308774 A1 | 10/2016 | Astigarraga et al. | |
| 2016/0321150 A1* | 11/2016 | Dankberg | G06F 11/2069 |
| 2016/0373337 A1 | 12/2016 | DeCusatis et al. | |
| 2017/0034064 A1 | 2/2017 | Everhart et al. | |
| 2017/0041088 A1* | 2/2017 | Yeshanov | H04B 7/18508 |
| 2017/0068483 A1 | 3/2017 | Uchiyama | |
| 2017/0075753 A1 | 3/2017 | Cypher et al. | |
| 2017/0077950 A1 | 3/2017 | Palov et al. | |
| 2017/0083244 A1 | 3/2017 | Reinart | |
| 2017/0083416 A1 | 3/2017 | Richardson et al. | |
| 2017/0085555 A1 | 3/2017 | Bisikalo et al. | |
| 2017/0090772 A1 | 3/2017 | Kripalani | |
| 2017/0090773 A1 | 3/2017 | Vijayan et al. | |
| 2017/0109247 A1 | 4/2017 | Nakajima | |
| 2017/0215303 A1 | 7/2017 | Mick et al. | |
| 2017/0304725 A1 | 10/2017 | Perlman | |
| 2017/0366622 A9 | 12/2017 | St Laurent et al. | |
| 2018/0014041 A1 | 1/2018 | Du et al. | |
| 2018/0041485 A1 | 2/2018 | O'Hare et al. | |
| 2018/0239683 A1* | 8/2018 | Dankberg | H04L 67/1097 |
| 2019/0044611 A1* | 2/2019 | Treesh | H04B 7/2041 |
| 2019/0222299 A1* | 7/2019 | Treesh | H04B 7/18508 |

* cited by examiner

800

| Device | Status | Bad Sector(s) |
|--------|--------|---------------|
| DSD[1] | Active | NA |
| DSD[2] | Standby | NA |
| DSD[3] | NA | NA |
| DSD[4] | Active | NA |
| DSD[5] | Active | a,b,c |

810 = Device column; 820 = Status column; 830 = Bad Sector(s) column; 805 = rows

FIG. 8

SELF-ORGANIZED STORAGE NODES FOR DISTRIBUTED DELIVERY NETWORK

CROSS REFERENCES

The present Application is a Continuation of U.S. patent application Ser. No. 14/928,167 by Dankberg, et al., entitled, "SELF-ORGANIZED STORAGE NODES FOR DISTRIBUTED DELIVERY NETWORK" filed Oct. 30, 2015, which claims priority to U.S. Provisional Patent Application No. 62/153,823 by Dankberg, et al., entitled, "SELF-ORGANIZED STORAGE NODES FOR DISTRIBUTED DELIVERY NETWORK", filed Apr. 28, 2015, the entirety of each of which being incorporated herein by reference for any and all purposes.

BACKGROUND

Field of the Disclosure

The present disclosure relates to broadband communications in general, and in particular, to a distributed delivery network for providing capacity enhancement in broadband communications networks.

Relevant Background

As the use of communications and networking continues to grow around the world, users are demanding a high-quality broadband experience even in remote areas or mobile environments. The ability to provide a high-quality broadband experience in these environments presents many challenges.

SUMMARY

Methods, systems, and devices are described for providing capacity enhancement in broadband communication networks. In some examples, the effective capacity of a communication link between a network and multiple communication devices is enhanced by using a distributed delivery network to store messages for subsequent delivery to the communication devices. The communication devices may receive network access service via a network gateway device that communicates over the shared communication link. The distributed delivery network may include one or more distributed storage devices, which may be connected with the network gateway device via a local network.

In some examples, each distributed storage device includes at least one rotating disk storage device, a network interface for communicating with the network gateway device, and one or more environmental sensors. Each distributed storage device may include a control circuit to manage operation of the distributed storage device. The control circuit may monitor data from the environmental sensor(s) and transition the distributed storage device between an active state where messages are stored in or retrieved from the rotating disk storage device, and a standby state where access of the rotating disk storage device is suppressed to protect the rotating disk storage device.

The distributed delivery network may provide control of message flow and message redundancy for messages requested by the communication devices via the network gateway device. For example, redundancy of messages on the distributed delivery network may be determined by frequency of request of the messages. The distributed storage devices may self-organize control operations for the distributed delivery network. In some examples, one distributed storage device may operate as a leader device for message flow in the distributed delivery network. The leader device may monitor the operational states of distributed storage devices and maintain an index of messages stored in the distributed storage devices for retrieval. The leader device may also monitor message flow via the network gateway device and manage redundancy for messages stored in the distributed delivery network. The leader device may be statically defined or may be dynamically selected based on a predetermined or pseudo-random selection scheme.

A communications system including a network gateway device and a plurality of distributed storage devices coupled to the network gateway device is described. In some aspects, a distributed storage device of the plurality of distributed storage devices includes a housing, a rotating disk storage device within the housing, a network interface to support communication with the network gateway device, a sensor to produce a sensor signal indicating a characteristic of an environment external to the housing, and a control circuit to detect an adverse operating condition for the rotating disk storage device based on the sensor signal, and to transition the distributed storage device from an active state to a standby state upon detection of the adverse operating condition. When in the active state, the distributed storage device may enable access of the rotating disk storage device to store messages received via the network interface, to retrieve the stored messages in response to requests received via the network interface, and to provide a given stored message of the stored messages for redundancy of storage within other distributed storage devices of the plurality of distributed storage devices based on a frequency of requests for the given stored message. When in the standby state, the distributed storage device may prevent access to the rotating disk storage device.

In some examples, upon transitioning from the active state to the standby state, the distributed storage device transmits an indication that the distributed storage device is unavailable. The indication that the distributed storage device is unavailable may be, for example, broadcast over a storage area network coupled with the network gateway device and the plurality of distributed storage devices. In some examples, the transition of the distributed storage device from the active state to the standby state is performed independently of an operational state of at least one other distributed storage device of the plurality of distributed storage devices.

According to some aspects, when in the standby state the distributed storage device configures the rotating disk storage device in a protected state. The protected state may include, for example, one or more of a parked media state, a deactivated state, or an unpowered state.

According to some aspects, when in the standby state the control circuit may detect a safe operating condition for the rotating disk storage device based on the sensor signal and transition the distributed storage device from the standby state to the active state upon detection of the safe operating condition.

In some examples of the communication system, the control circuit may determine that the distributed storage device is operating as a leader device for the plurality of distributed storage devices. The control circuit may, for example, determine that the distributed storage device is operating as the leader device for the plurality of distributed storage devices based on a result of a consensus election.

In some examples, the control circuit may, while the distributed storage device is operating as the leader device, determine a change for an index of the stored messages across the plurality of distributed storage devices, and broadcast the change for the index to the plurality of distributed storage devices.

In some examples, the control circuit may determine that the distributed storage device is no longer operating as the leader device for the plurality of distributed storage devices. The control circuit may monitor broadcast messages for indications of changes to the index an update the index upon based on received indications of changes to the index.

In some examples, the control circuit may, while the distributed storage device is operating as the leader device, monitor for periodic status messages from the plurality of distributed storage devices, determine that a second distributed storage device from the plurality of distributed storage devices is unavailable based upon not receiving a periodic status message from the second distributed storage device, and flag one or more messages stored in the second distributed storage device as unavailable in the index.

In some examples, the control circuit may, while the distributed storage device is operating as the leader device, receive a request for a first message, determine that the first message is stored in a first distributed storage device of the plurality of distributed storage devices, retrieve the first message from the first distributed storage device, and provide the first message in response to the request.

In some examples, the control circuit may, while the distributed storage device is operating as the leader device, receive a request for a first message, determine that the first message is stored in a first distributed storage device of the plurality of distributed storage devices, and provide a proxy address of the first message at the first distributed storage device in response to the request.

In some examples, the control circuit may, while the distributed storage device is operating as the leader device, determine an amount of redundancy for storing a the given stored message in the plurality of distributed storage devices based on the frequency of requests, and forward the given stored message for storing in one or more distributed storage devices of the plurality of distributed storage devices based on the determined amount of redundancy.

According to some aspects, the plurality of distributed storage devices includes a first set of distributed storage devices having a first reliability characteristic and a second set of distributed storage devices having a second, lower reliability characteristic. In some examples, the control circuit may, while the distributed storage device is operating as the leader device, determine that the frequency of requests for the given stored message exceeds a threshold, and forward the given stored message for storing in a distributed storage device of the first set of distributed storage devices.

In some examples, the control circuit may receive information related to an impending adverse operating condition for the rotating disk storage device and transition the distributed storage device from the active state to the standby state based on the impending adverse operating condition.

In some examples, the control circuit may detect a failure of the rotating disk storage device and broadcast an indication that the distributed storage device is unavailable based on the detected failure.

According to some aspects, the control circuit may perform a periodic diagnostic scan on the rotating disk storage device. In some examples, the control circuit may determine one or more storage locations of the rotating disk storage device failing the periodic diagnostic scan, identify one or more messages stored in the one or more storage locations, broadcast an indication that the one or more messages are unavailable, and flag the one or more storage locations as unavailable for further use.

According to some aspects, the network interface comprises any of a wired networking interface, a wireless networking interface, or combinations thereof.

According to some aspects, the distributed storage device includes a fitting mounted to the housing for coupling with an external bracket, and a release lever coupled with the fitting to release the fitting from the external bracket.

According to some aspects, the network gateway device provides network access service for a mobile environment via a shared wireless communication link. The mobile environment may be, for example, an aircraft, and the plurality of distributed storage devices may be located on the aircraft. The shared wireless communication link may be a satellite communications link.

According to some aspects the sensor may include any of an inertial measurement sensor, a gyroscope, a temperature sensor, or combinations thereof.

A method for enhancing capacity of a communication system is described. The method may include providing a distributed storage device of a plurality of distributed storage devices coupled to a network gateway device in the communications system. The method may include operating the distributed storage device in an active state, the operating including providing access of a rotating disk storage device to store messages received via a network interface, retrieving the stored messages in response to requests received via the network interface, and providing a given stored message of the stored messages for redundancy of storage within other distributed storage devices of the plurality of distributed storage devices based on a frequency of requests for the given stored message. The method may include detecting an adverse operating condition for the rotating disk storage device of the distributed storage device based on a sensor signal from a sensor of the distributed storage device indicating a characteristic of an environment of the distributed storage device, transitioning the distributed storage device from the active state to a standby state upon detection of the adverse operating condition, and preventing, in the standby state, access to the rotating disk storage device.

According to some aspects, the method includes transmitting, upon transitioning from the active state to the standby state, an indication that the distributed storage device is unavailable. The method may include configuring, in the standby state, the rotating disk storage device in a protected state.

According to some aspects, the method includes detecting, in the standby state, a safe operating condition for the rotating disk storage device based on the sensor signal, transitioning the distributed storage device from the standby state to the active state upon detection of the safe operating condition.

According to some aspects, the method includes determining that the distributed storage device is operating as a leader device for the plurality of distributed storage devices. The determining that the distributed storage device is operating as the leader device for the plurality of distributed storage devices may be based on a result of a consensus election.

According to some aspects, the method includes, when the distributed storage device is operating as a leader device for the plurality of distributed storage devices, determining a change for an index of the stored messages across the plurality of distributed storage devices, and broadcasting the change for the index to the plurality of distributed storage devices.

According to some aspects, the method includes determining that the distributed storage device is no longer operating as the leader device for the plurality of distributed storage devices, monitoring broadcast messages for indications of changes to the index, and updating the index upon based on received indications of changes to the index.

According to some aspects, the method includes, when the distributed storage device is operating as a leader device for the plurality of distributed storage devices, monitoring for periodic status messages from the plurality of distributed storage devices, determining that a second distributed storage device from the plurality of distributed storage devices is unavailable based upon not receiving a periodic status message from the second distributed storage device, and flagging one or more messages stored in the second distributed storage device as unavailable in the index.

According to some aspects, the method includes, when the distributed storage device is operating as a leader device for the plurality of distributed storage devices, receiving a request for a first message, determining that the first message is stored in a first distributed storage device, retrieving the first message from the first distributed storage device, and provide the first message in response to the request.

According to some aspects, the method includes, when the distributed storage device is operating as a leader device for the plurality of distributed storage devices, receiving a request for a first message, determining that the first message is stored in a first distributed storage device, and providing an address of the first message at the first distributed storage device in response to the request.

According to some aspects, the method includes, when the distributed storage device is operating as a leader device for the plurality of distributed storage devices, determining an amount of redundancy for storing the given stored message in the plurality of distributed storage devices based on the frequency of requests, and forwarding the given stored message for storing in one or more distributed storage devices of the plurality of distributed storage devices based on the determined amount of redundancy.

According to some aspects, the method includes receiving information related to an impending adverse operating condition for the rotating disk storage device and transitioning the distributed storage device from the active state to the standby state based on the impending adverse operating condition.

According to some aspects, the method includes detecting a failure of the rotating disk storage device, and broadcasting an indication that the distributed storage device is unavailable based on the detected failure.

According to some aspects, the method includes performing a periodic diagnostic scan on the rotating disk storage device. In some examples, the method includes determining one or more storage locations of the rotating disk storage device failing the periodic diagnostic scan, identifying one or more messages stored in the one or more storage locations, broadcasting an indication that the one or more messages are unavailable, and flagging the one or more storage locations as unavailable for further use.

Further scope of the applicability of the described systems, methods, apparatuses, or computer-readable media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 8 shows a diagram of an example operational state table in accordance with various aspects of the disclosure.

DETAILED DESCRIPTION

Figure 1:
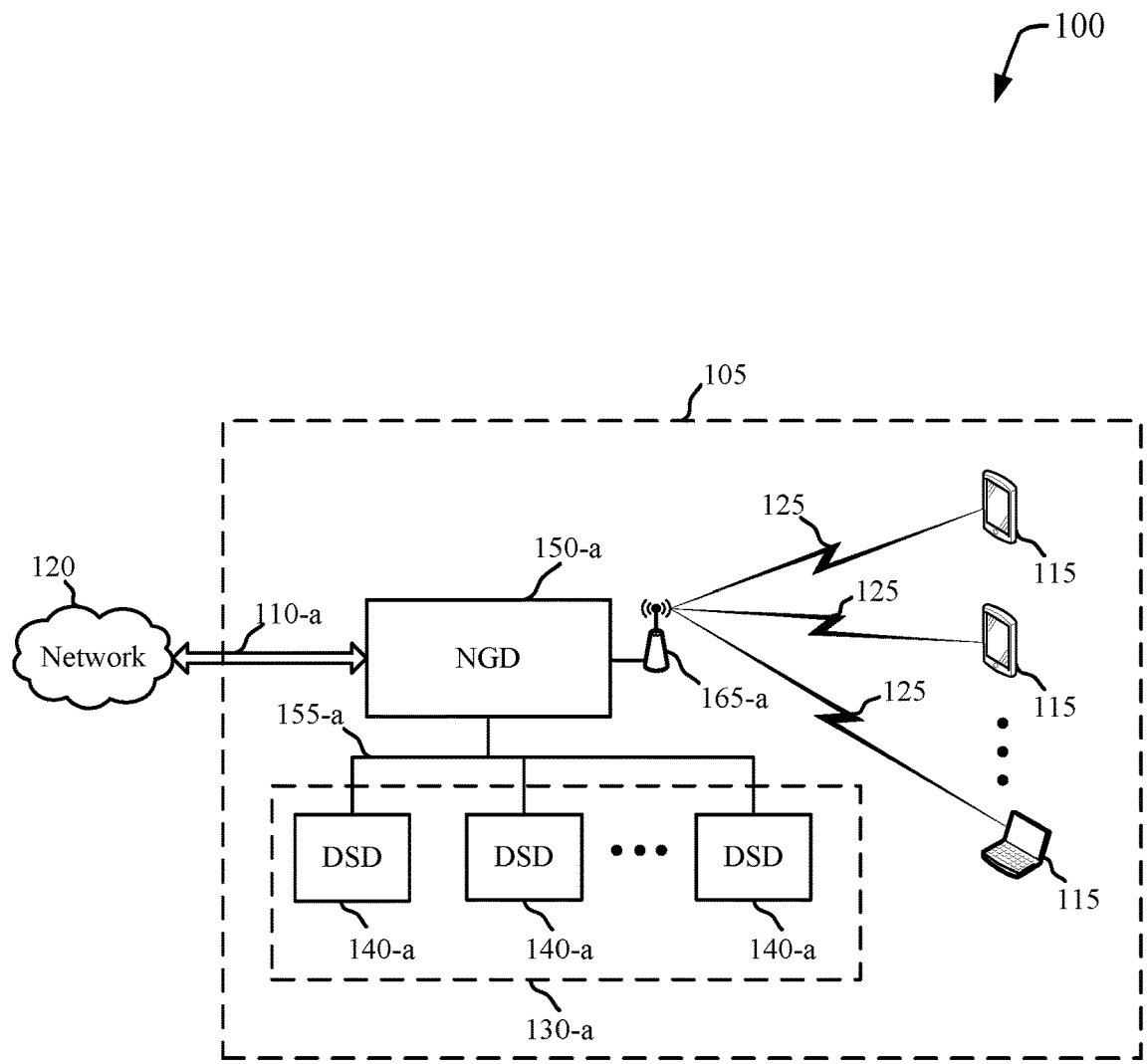
FIG. 1 shows an example communications environment for capacity enhancement of network access service in accordance with various aspects of the disclosure.

The described feature generally relate to capacity enhancement of a shared communication link using a distributed delivery network. The distributed delivery network may include multiple distributed storage devices, which may each include a rotating disk storage device. The distributed delivery network may self-organize for managing message flow and redundancy while distributed storage devices may enter and leave the distributed delivery network at any time.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

The rise in consumption of network multimedia content such as systems providing audio and video on demand (AVOD) and use of audio and video sharing services (e.g., YouTube, Vine, etc.) has dramatically increased consumer bandwidth usage. In addition, users increasingly expect a high-quality broadband experience while travelling. For example, there is a growing demand for network access service during air travel, and the desire to be able to access network multimedia content on airplanes and in other mobile environments has created challenges in providing sufficient bandwidth for users over bandwidth-limited wireless networks.

In various mobile environments, multiple users may be provided network access service via a shared communication link. For example, users may connect their communication devices to a wireless local area network (WLAN), which routes data communications to other networks (e.g., the Internet) via the shared communication link. The shared communication link may be a wireless link (e.g., cellular link, satellite communications link, etc.), and may have limited communication bandwidth. For example, while the resources (e.g., frequency, time, etc.) of a wireless network may be flexibly applied for multiple users, the overall capacity of the network may be limited, and congestion can occur when users request more resources at a particular time than the network can support. Increasing bandwidth for wireless communications systems is expensive and sometimes additional usable spectrum is unavailable. Therefore, providing a high-quality network access experience at a reasonable cost in mobile environments presents many challenges.

FIG. 1 shows an example communications environment 100 for capacity enhancement of network access service in accordance with various aspects of the disclosure. The communications environment 100 includes a network gateway device 150-a that provides network access service to multiple communication devices 115 in a mobile environment 105 via a shared communication link 110-a. The communication devices 115 may be mobile devices (e.g., smartphones, laptops, tablets, netbooks, and the like) and may communicate with the network gateway device 150-a via communication links 125. Communication links 125 may be, for example, part of a local network such as a WLAN supported by an access point 165-a.

The shared communication link 110-a may be a wireless communication link between the network gateway device 150-a located on the mobile environment 105 and one or more networks 120, which may include any suitable public or private networks and may be connected to other communications networks such as the Internet, telephony networks (e.g., Public Switched Telephone Network (PSTN), etc.), and the like. The information rate for servicing the communication devices 115 may depend on the number of communication devices 115 in the mobile environment 105 and types of traffic requested by the users, and may vary over time. For example, the network traffic provided over the shared communication link 110-a may include a mix of web traffic, streaming traffic, and other types of traffic. The types of network traffic that generally consume the most communication resources are file sharing and video communications (e.g., video conferencing, video streaming, etc.) with some estimates indicating that as much as 50% of all Internet traffic is video streaming traffic.

The probability distribution of requested content tends to be non-uniform. For example, the same streaming traffic may be requested by multiple users at different points in time, or may be shared across multiple users if they request broadcast or multicast traffic. In one specific example, the percentage of unique messages of one popular video library requested as a function of message requests is approximately log-linear, with 20% of the unique messages accounting for approximately 85% of the message requests. Similarly, content such as "viral" videos may be repeatedly requested by many different users within a span of days or even hours.

The capacity of shared communication link 110-a may be flexible to meet the information rate demands of the communication devices 115. However, the information rate provided by shared communication link 110-a may have limits given by system bandwidth, hardware limitations (e.g., power constraints), or overall system capacity. For example, communications environment 100 may be part of a communications system, which may have a limited overall information rate capacity. In addition, the incremental cost for the information rate provided over shared communication link 110-a may be relatively high. While it may be possible to restrict some types of traffic (e.g., high definition video, etc.), this may degrade the network access experience for various users. These and other issues of providing network access service in mobile environments typically result in high cost of service, a reduced quality user experience, or both.

One way to increase the effective information rate of the shared communication link 110-a is to store some content locally to the mobile environment 105. For example, when a communication device 115 makes requests for a set of messages from network 120 via the shared communication link 110-a, the messages can also be stored in a storage system connected to network gateway device 150-a. If the same set of messages are then later requested by other communication devices 115, the stored messages can be provided from the local storage instead of being re-sent over the shared communication link 110-a. The amount of effective information rate enhancement provided by locally stored content depends on the amount of storage, the reliability of the storage system, and the probability distribution of requested messages. To provide a significant effective increase in information rate (e.g., 2× or higher) provided to the communication devices 115, the local storage capacity required may be large. For example, to cover a substantial percentage of streaming traffic (e.g., 10-50%), storage capacities in the 10-200 Terabyte (TB) range may be necessary.

Different types of storage media may have different trade-offs between storage capacity and reliability. For example, a rotating disk storage device (commonly known as a hard disk drive (HDD)) uses a rotating magnetic media platter with a read and write head that operates over the magnetic surface to detect and modify magnetization of the magnetic medium on the platter. Rotating disk storage devices have relatively high storage capacity while providing data access in any desired order (e.g., random access). A solid state drive (SSD) is a data storage device that uses non-volatile solid state (e.g., NAND flash memory, magnetoresistive random-access memory (MRAM), etc.) to persistently store data (maintain data when powered off). Compared with HDDs, SSDs are typically more resistant to physical shock, run silently, have lower access time, and less latency. In addition, SSDs may be more reliable than HDDs in some environments. For example, because HDDs have read/write heads that float above spinning platters, HDDs may be susceptible to shock and vibration, as well as other mechanical failure mechanisms. Because SSDs have no moving parts, mechanical failure rates for SSDs are generally low. However, SSDs may have a limited number of write cycles (or erase cycles), which may affect life-time of the drive in certain applications.

Higher cost is a substantial drawback to the use of SSDs for larger capacity storage applications. For example, consumer-grade SSDs may be approximately 10 times more expensive per unit of storage than consumer-grade HDDs. Although prices for SSDs are declining, the consumer price for SSDs may currently be in the range of $500-$1500 per TB of storage (depending on drive storage size) compared to approximately $40-80 per TB for HDDs. Additionally, the available storage capacity in a single HDD device is generally larger than that available for a single SSD device. For example, the largest available 3.5" consumer HDDs may be in the 8-12 TB range, while the largest available SSDs, although a smaller form factor, may be in the 1-2 TB range. Thus, many more SSD devices may be necessary to provide a given total storage size.

To create a storage system using multiple drive devices, data virtualization techniques such as redundant array of independent disks (RAID) may be used to combine multiple drive devices into a single logical unit that stores data using redundancy techniques. A commonly used RAID technique is data mirroring where a set of data is written to two or more drive devices, and the data is available as long as at least one drive device is functional. Another RAID technique for use with more than two drive devices is striping with distributed parity information. Striping with distributed parity information may provide higher effective storage capacity for a given total storage size but is only tolerant of failure of a single drive device. Fault tolerance may be increased by increasing the parity information (e.g., double parity information for fault tolerance of up to two failed drives, etc.), at the expense of effective capacity.

In some cases, the mobile environment 105 may be subject to substantial shock and vibration, as well as other extreme environmental conditions. For example, the mobile environment 105 may be an aircraft, which may suffer from vibration due to engines and hydraulic systems, and may encounter turbulence that results in significant gravitational forces (g-forces) seen by components on the aircraft. Other mobile environments such as ships and trains may also see significant shock or vibration occur intermittently. Providing a robust and cost-effective local storage solution for increasing effective information rate for a shared communication link in these types of mobile environments thus presents many challenges.

In embodiments, the communications environment 100 is configured to increase the effective capacity between the network 120 and the mobile devices 115 by using a distributed delivery network 130-a to store messages for subsequent delivery to communication devices 115. The distributed delivery network 130-a includes one or more distributed storage devices 140-a, which may be connected with the network gateway device 150-a via a local network link 155-a (e.g., storage area network (SAN), etc.). Each distributed storage device 140-a may include at least one rotating disk storage device (e.g., HDD, etc.), a network interface (e.g., Ethernet, WLAN, etc.) for communicating with the network gateway device 150-a, one or more environmental sensors such as an inertial measurement sensor (e.g., accelerometer, etc.), a gyroscope, a temperature sensor, and the like. Each distributed storage device 140-a may include a control circuit to manage operation of the distributed storage device 140-a within the distributed delivery network 130-a. The control circuit may monitor data from the environmental sensor(s) and transition the distributed storage device 140-a between an active state where messages are stored in or retrieved from the rotating disk storage device, and a standby state where access of the rotating disk storage device is suppressed to protect the rotating disk storage device. Operational state transitions may be performed independently and autonomously by each distributed storage device 140-a according to the local environmental conditions experienced by the distributed storage device 140-a, which may be different than environmental conditions experienced by other distributed storage devices 140-a.

The distributed delivery network 130-a may provide control of message flow and message redundancy for messages requested by the communication devices 115 via the network gateway device 150-a. For example, redundancy of messages on distributed delivery network 130-a may be determined according to a storage policy that is based on frequency of request of the messages. The distributed storage devices 140-a may self-organize control operations for distributed delivery network 130-a. In some examples, one distributed storage device 140-a may operate as a leader device for message flow in the distributed delivery network 130-a. The leader device may monitor the operational states of distributed storage devices 140-a and maintain an index of messages stored in the distributed storage devices 140-a for retrieval. The leader device may also monitor message flow via the network gateway device 150-a and manage redundancy for messages stored in the distributed delivery network 130-a. The leader device may be statically defined or may be dynamically selected based on a predetermined or pseudo-random selection scheme.

Figure 2:
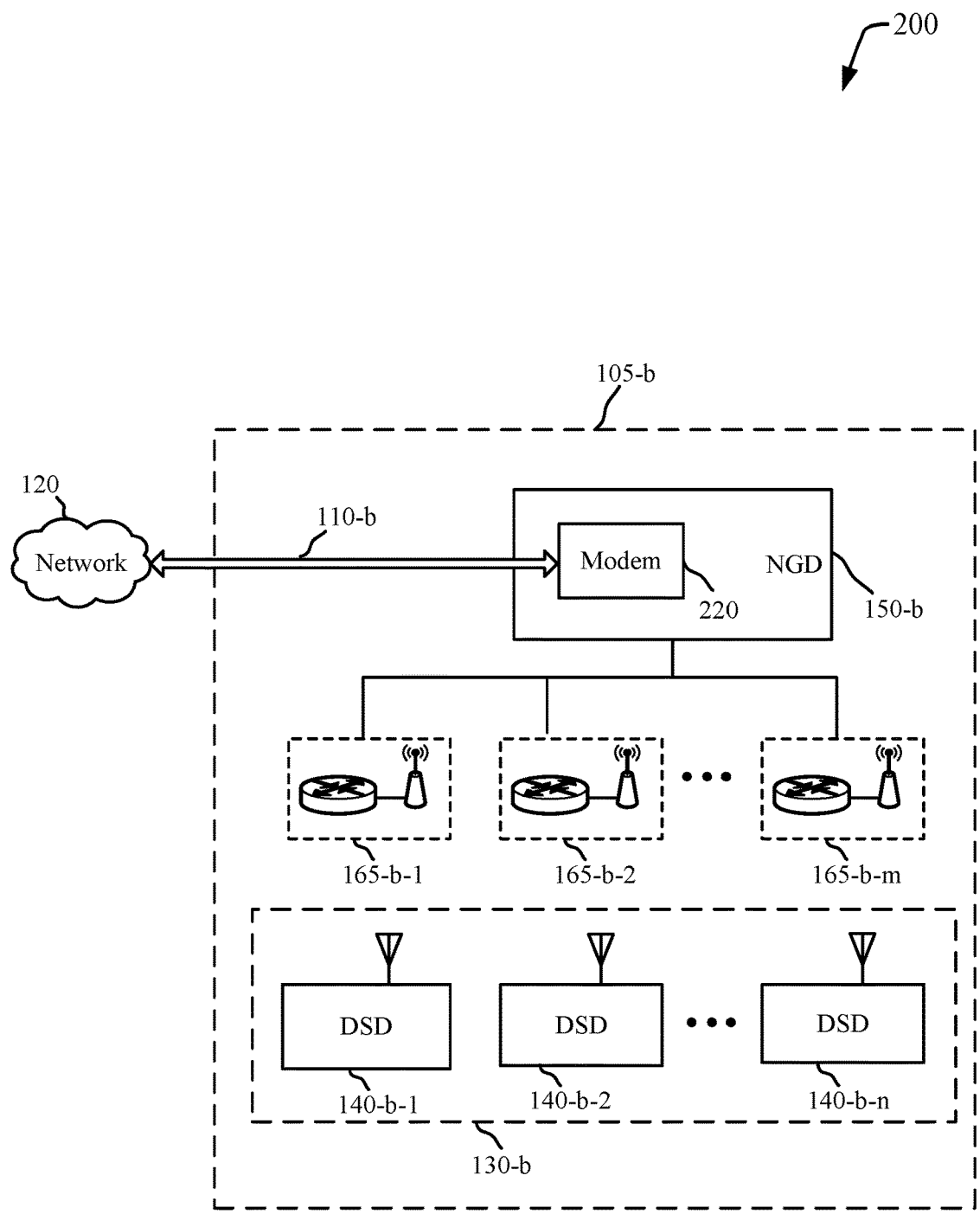
FIG. 2 shows an example communications environment for capacity enhancement of network access service in accordance with various aspects of the disclosure.

FIG. 2 shows an example communications environment 200 for capacity enhancement of network access service in accordance with various aspects of the disclosure. The communications environment 200 includes a network gateway device 150-b that provides network access service to multiple communication devices (not shown) within mobile environment 105 via a shared communication link 110-b. The shared communication link 110-b may be a wireless communication link between the network gateway device 150-b located on the mobile environment 105-b and networks 120 (e.g., private networks, the Internet, etc.). Communications over the shared communication link 110-b may be performed by a modem 220, which may be integrated with the network gateway device 150-*b*, or may be a separate component, in some examples.

In communications environment 200, network gateway device 150-*b* is connected to multiple wireless access points (WAPs) 165-*b* (e.g., WAP 165-*b*-1, 165-*b*-2, 165-*b*-*m*, etc.), which provide connection points for the communication devices to connect to network gateway device 150-*b* and request content via shared communication link 110-*b*. WAPs 165-*b* may be distributed about the mobile environment 105-*b*, and may provide traffic switching or routing functionality (e.g., as part of a WLAN extended service set (ESS), etc.).

As illustrated in FIG. 2, communications environment 200 includes distributed delivery network 130-*b* to increase the effective capacity of shared communication link 110-*b*. Distributed delivery network 130-*b* includes multiple distributed storage devices 140-*b* (e.g., 140-*b*-1, 140-*b*-2, 140-*b*-*n*, etc.), which each may include the components of distributed storage devices 140-*a* discussed with reference to FIG. 1. Each distributed storage device 140-*b* may operate as a separate logical storage node on distributed delivery network 130-*b*. The distributed storage devices 140-*b* may be distributed in different locations throughout the mobile environment 105-*b*, and may communicate with network gateway device 150-*b* via one or more WAPs 165-*b*. The distributed storage devices 140-*b* may also communicate directly with each other (e.g., peer-to-peer) for selecting a leader device and managing message flow in distributed delivery network 130-*b*.

Figure 3:
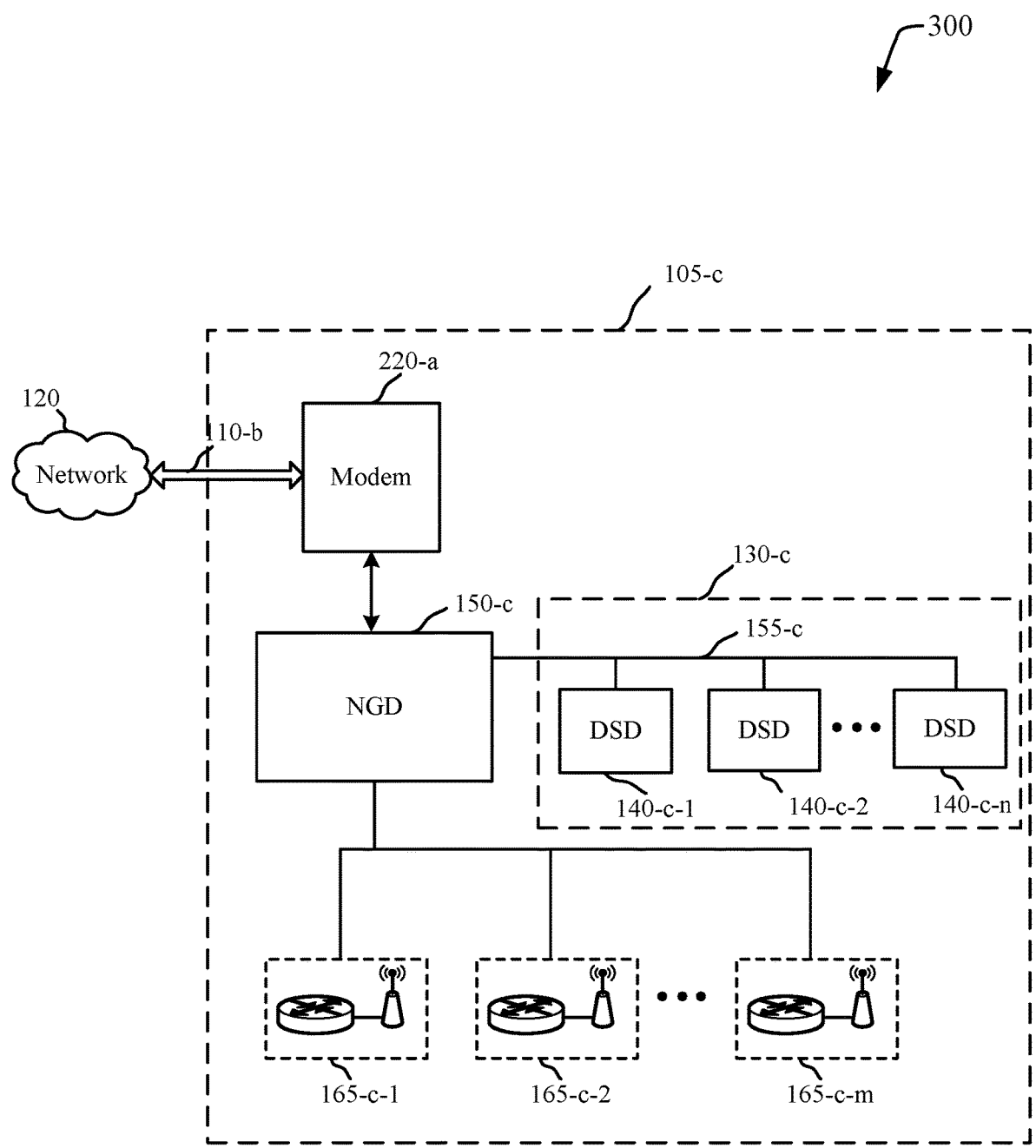
FIG. 3 shows an example communications environment for capacity enhancement of network access service in accordance with various aspects of the disclosure.

FIG. 3 shows an example communications environment 300 for capacity enhancement of network access service in accordance with various aspects of the disclosure. The communications environment 300 includes a network gateway device 150-*c* that provides network access service to multiple communication devices (not shown) within mobile environment 105-*c* via a shared communication link 110-*c*. The shared communication link 110-*c* may be a wireless communication link between the network gateway device 150-*c* located on the mobile environment 105-*c* and networks 120 (e.g., private networks, the Internet, etc.). Communications over the shared communication link 110-*c* may be performed by a modem 220-*a*, which may be integrated with the network gateway device 150-*c*, or may be a separate component, in some examples. In communications environment 300, network gateway device 150-*c* is connected to multiple wireless access points (WAPs) 165-*c* (e.g., WAP 165-*c*-1, 165-*c*-2, 165-*c*-*m*, etc.), which may be the WAPs 165-*b* discussed above with reference to FIG. 2.

As illustrated in FIG. 3, communications environment 300 includes distributed delivery network 130-*c* to increase the effective capacity of shared communication link 110-*c*. Distributed delivery network 130-*c* includes multiple distributed storage devices 140-*c* (e.g., 140-*c*-1, 140-*c*-2, 140-*c*-*n*, etc.), which each may include the components of distributed storage devices 140 discussed with reference to FIG. 1 or 2. Each distributed storage device 140-*c* may operate as a separate logical storage node on distributed delivery network 130-*c*. The distributed storage devices 140-*c* may be distributed in different locations throughout the mobile environment 105-*c*, and may communicate with network gateway device 150-*b* via network 155-*c*, which may be a wired network. In some examples, network 155-*c* may be a storage area network (SAN) (e.g., Ethernet, Fibre Channel, etc.). The distributed storage devices 140-*c* may also communicate directly with each other (e.g., peer-to-peer) via network 155-*c* for selecting a leader device and managing message flow in distributed delivery network 130-*c*.

In some examples of communications environments 100, 200 or 300, messages may be pre-loaded or pushed to a distributed delivery network 130 from one or more content providers. For example, a content provider may be allocated a portion of a distributed delivery network 130 for pre-loading with highly-requested content. Distributed delivery network 130 may determine redundancy for the messages in the pre-loaded content. For example, distributed delivery network 130 may store messages that are more frequently requested (e.g., based on historical information of the content provider, etc.) with higher redundancy. In some examples, the pre-loaded or pushed content may be updated based on changes in frequency of requests for the content. For example, the distributed delivery network 130 may determine that certain content of the pushed content is seldom requested in the mobile environment 105, and may adapt the portion of the content of the content provider that is pre-loaded based on the requests for content in the mobile environment 105. In some examples, updating of the pre-loaded or pushed content may be performed during times of relatively low network activity (e.g., when an aircraft is not in flight, at night, etc.).

In some examples of communications environments 100, 200 or 300, distributed delivery networks 130-*b* or 130-*c* may include one or more high-reliability or shock and vibration tolerant storage nodes. For example, a subset of distributed storage devices 140 may be configured to include solid-state storage media (e.g., SSD, etc.). A distributed storage device 140 with high-reliability or shock and vibration tolerant storage may operate as the leader device (e.g., manage message flow, manage redundancy of messages, maintain the index of storage messages for the distributed delivery networks 130, etc.). In some embodiments, the high-reliability or shock and vibration tolerant device may be used to store the most requested messages (e.g., with or without redundancy in the other distributed storage devices 140). In some examples, the network gateway device 150 may include the high-reliability storage device and may operate as the leader device for the distributed delivery network 130. Additionally or alternatively, distributed storage devices 140 may include a combination of a rotating disk storage device and solid-state storage (e.g., hybrid drive, etc.). The solid-state storage may be used for maintaining the index of stored messages, or for the most highly requested content, in some cases.

In some examples of communications environments 100, 200 or 300, messages may be pre-fetched from a rotating disk storage device of distributed storage devices 140 and buffered in solid-state storage (e.g., RAM memory, SSD, etc.). For example, streaming traffic may be organized as an ordered list of messages such that when a streaming media file is requested, the messages that make up the file will generally be transferred in order (e.g., subject to packet flow and acknowledgement, etc.). Thus, for streaming media programming, distributed delivery network 130 can predict that the next messages in the ordered list for the streaming media will likely be requested (e.g., unless the user pauses or stops the stream, etc.). Turbulence or other events that cause shock may typically last from a few seconds to a few minutes. Therefore, distributed delivery network 130 may pre-fetch messages corresponding to several minutes or more of a requested streaming media file from the rotating disk storage device of a distributed storage device 140 and store the messages in the solid-state storage (e.g., in a high reliability node of the distributed delivery network, the solid state storage of a hybrid drive, etc.). If a turbulence event occurs, the distributed delivery network 130 can continue to provide the buffered messages even when the rotating disk storage device is disabled for protection. While the streaming media player at the user device may have its own buffer, the distributed delivery network 130 may pre-fetch a longer time-window for the streaming media programming, up to and including the full streaming media file. The distributed delivery network 130 may maintain the pre-fetched messages for a predetermined amount of time, or until an event occurs (e.g., the solid-state storage buffer is full with active message flows, the aircraft lands, etc.).

Figure 4:
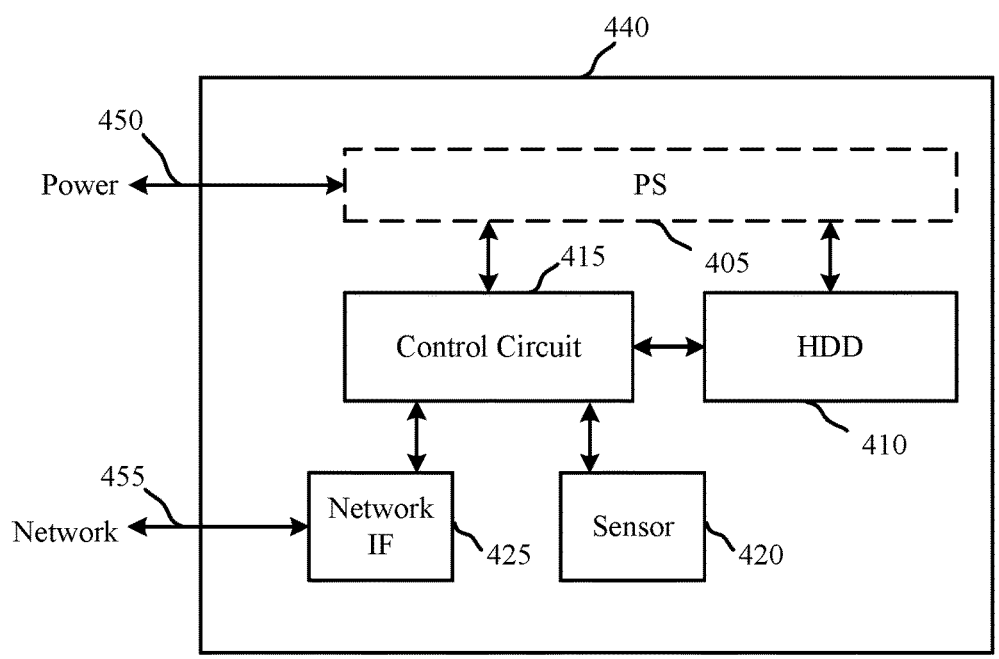
FIG. 4 shows a diagram of an example distributed storage device for a distributed delivery network in accordance with various aspects of the disclosure.

FIG. 4 shows a diagram of an example distributed storage device 140-*d* for a distributed delivery network in accordance with various aspects of the disclosure. Distributed storage device 140-*d* includes rotating disk storage device (e.g., HDD, etc.) 410, control circuit 415, environmental sensor 420, and network interface 425. The components of distributed storage device 140-*d* may be included within a physical housing 440 that connects to a power bus 450 and network signaling 455 (e.g., wired or wireless, etc.). Each of these components may be in communication with each other.

The control circuit 415 may manage operation of the distributed storage device 140-*d* for operation in a distributed delivery network. For example, the control circuit 415 may manage operational states of the distributed storage device 140-*d*, monitor sensor data from the environmental sensor 420, and manage communication with a network gateway device, other distributed storage devices, or other devices (e.g., communication devices 115 of FIG. 1) via network interface 425. Network interface 425 may implement wired network interfaces (e.g., Ethernet, Fibre Channel, etc.) and/or wireless network interfaces (e.g., IEEE 802.11 compliant interfaces, etc.).

Rotating disk storage devices may have maximum operating specifications for vibration and shock, which are typically specified in acceleration within a given frequency range (vibration) or over a given time period (shock). Environmental sensor 420 may include an inertial measurement sensor (e.g., accelerometer, etc.), which may indicate when the distributed storage device 140-*d* is experiencing high levels of vibration or shock. The control circuit 415 may filter the accelerometer data to determine the acceleration, velocity, or displacement, and may compare these values with one or more thresholds to determine if the vibration or shock experienced by the distributed storage device 140-*d* exceeds operating thresholds for the rotating disk storage device 410, which may be considered adverse environmental conditions for the rotating disk storage device 410. Additionally or alternatively, environmental sensor 420 may include other sensors such as a gyroscope or a temperature sensor. The control circuit 415 may monitor data from these sensors to determine if environmental conditions (e.g., orientation, temperature, etc.) exceed operational tolerances. The control circuit 415 may transition the distributed storage device 140-*d* from an active state to a standby state based on detection of adverse operating conditions. Additionally or alternatively, the control circuit 415 may receive information related to an impending adverse operating condition for the rotating disk storage device 410 and may transition the distributed storage device from the active state to the standby state based on the impending adverse operating condition. For example, the control circuit 415 may receive information from an aircraft data bus, which may include weather information indicating that impending turbulence is in the flight path. Additionally or alternatively, distributed storage devices may communicate local environmental conditions from different locations within the aircraft, which may indicate that vibrations or turbulence is increasing and an adverse environmental condition is impending.

Figure 5:
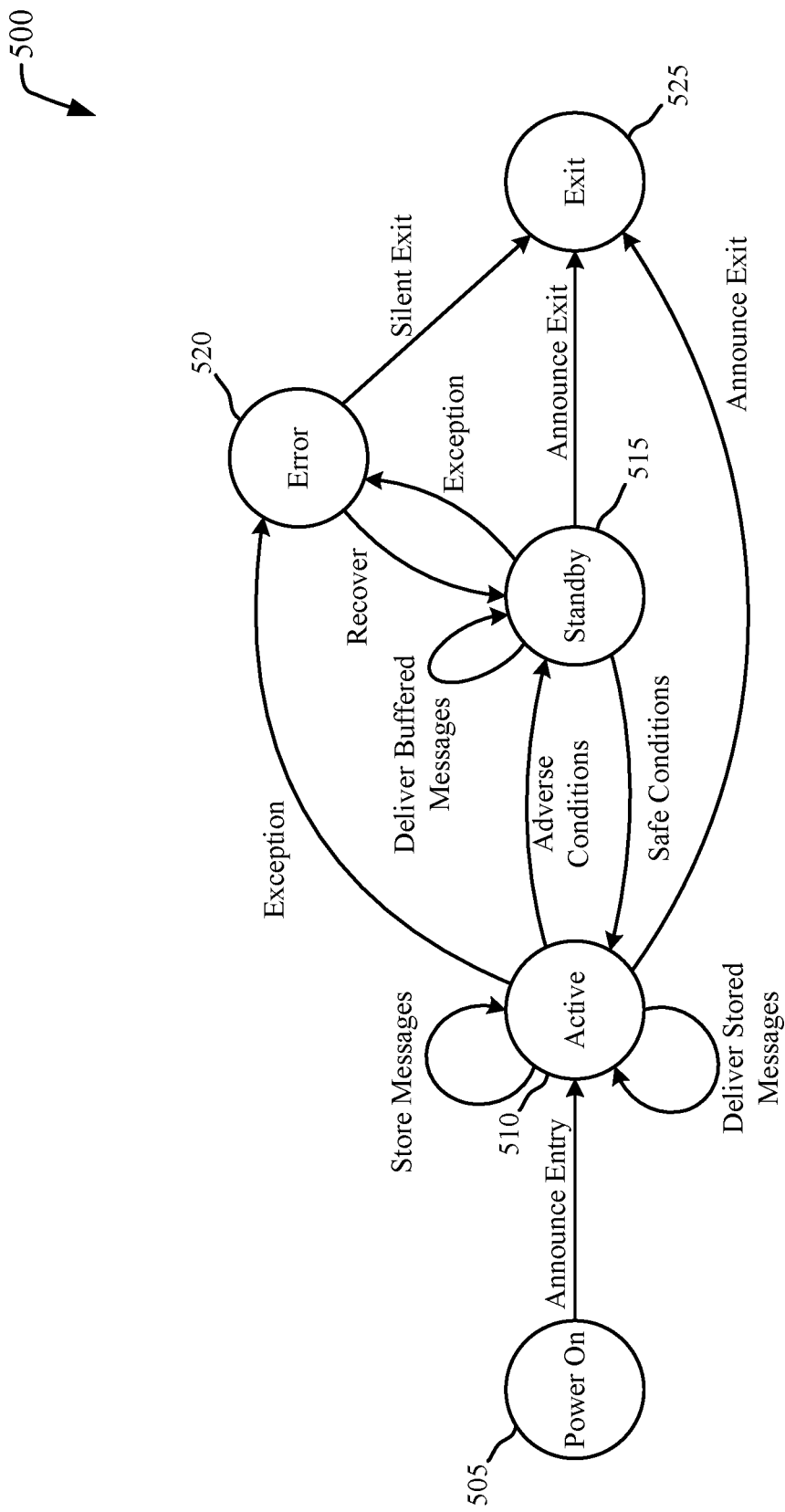
FIG. 5 shows an example operational state diagram for a distributed storage device 140 in accordance with various aspects of the disclosure.

FIG. 5 shows an example operational state diagram 500 for a distributed storage device 140 in accordance with various aspects of the disclosure. For example, operational state diagram 500 may illustrate operational states for distributed storage device 140-*d* of FIG. 4. The operational states of the distributed storage device 140-*d* may include an initial power on state 505, an active state 510, a standby state 515, an error state 520, and an exit state 525. Transitions between states may be managed by the control circuit 415. The distributed storage device 140-*d* may start in the power on state 505 when powered on. From the power on state 505, the distributed storage device 140-*d* may transition to the active state and announce entry of the distributed storage device 140-*d* for operation on a distributed delivery network such as distributed delivery networks 130 of FIGS. 1-3.

In the active state 510, access to the rotating disk storage device 410 is enabled. For example, the distributed storage device 140-*d* may receive messages for storage via the network interface 425 in the active state and store the messages in the rotating disk storage device 410. The distributed storage device 140-*d* may also receive requests for stored messages in the active state and may retrieve and deliver the stored messages in response to the requests.

In the active state, the control circuit 415 may monitor the sensor data from environmental sensor 420 and determine when environmental conditions for the distributed storage device 140-*d* are adverse for operation of the rotating disk storage device 410. If, while in the active state 510, the control circuit 415 detects an adverse operating condition for the rotating disk storage device 420, the control circuit 415 may transition the distributed storage device 140-*d* to the standby state 515. The control circuit 415 may also announce (e.g., broadcast, etc.) that the distributed storage device 140-*d* is entering the standby state 515 and is no longer available for storing or delivering messages.

When the distributed storage device 140-*d* is in the standby state 515, access to the rotating disk storage device 410 is disabled and the rotating disk storage device 410 may be configured in a protected state. For example, the rotating disk storage device 410 may be configured in a parked media or deactivated state, or may be unpowered. In some examples, the distributed storage device 140-*d* may include a disk buffer, which may be solid state memory (e.g., RAM, etc.). When entering the standby state 515, the distributed storage device 140-*d* may continue to deliver buffered messages based on requests received in the active state 510. Additionally or alternatively, if the distributed storage device 140-*d* includes a hybrid drive, the distributed storage device 140-*d* may continue to allow access to the solid-state storage of the hybrid drive in the standby state 515.

If an exception (e.g., recoverable error, etc.) occurs while in the active state 510 or the standby state 515, the distributed storage device 140-*d* transitions to the error state 520, where error recovery may be attempted. If error recovery in the error state 520 is successful, the distributed storage device 140-*d* transitions back to the standby state 515. If error recovery in the error state 520 is unsuccessful, the distributed storage device 140-*d* transitions to the exit state 525. Upon transitioning from the active state 510 to the error state 520, the distributed storage device 140-*d* may announce that the distributed storage device 140-*d* is no longer available for storing or delivering messages. The distributed storage device 140-*d* may also transition to the error state 520 if an unrecoverable error occurs while in the active state 510 or the standby state 515. In this instance, the distributed storage device 140-*d* may also announce that the distributed storage device 140-*d* is no longer available for storing or delivering messages.

In the standby state 515, the control circuit 415 may continue to monitor the sensor data from environmental sensor 420 and determine when environmental conditions for the distributed storage device 140-*d* are safe for operation. When safe operating conditions for the rotating disk storage device 410 are detected, the control circuit 415 may transition the distributed storage device 140-*d* back to the active state 510. The control circuit 415 may also announce (e.g., broadcast, etc.) that the distributed storage device 140-*d* is entering the active state 510 and is again available for storing or delivering messages.

Returning to FIG. 4, the distributed storage device 140-*d* may include a power supply 405, which may be coupled with a power bus 450 of a mobile environment, and may convert a supply voltage of the power bus 450 to internal voltages used by components of the distributed storage device 140-*d*. The power supply 405 may also provide robustness to power surges and the capability of replacing the distributed storage device 140-*d* without disrupting the power bus 450 or damaging the rotating disk storage device 410.

The housing 440 may be configured to orient the rotating disk storage device in a horizontal orientation as installed, and may include vibration dampening bushings between the housing 440 and brackets of the mobile environment 105. The housing may be configured with fittings that couple with the brackets and a release lever to release the fitting from the bracket. The power supply 405 may be configured to be connected to the power bus 450 while the power bus 450 is live (e.g., hot swappable).

As discussed above, the distributed storage devices 140 of distributed delivery networks 130 may operate according to a leader/follower topology for message flow management where one distributed storage device 140 acts as a leader device and the other distributed storage devices 140 act as follower devices. The leader device may monitor the operational states of follower devices and maintain a device state table that indicates which distributed storage devices 140 are in the active state and available for storing and retrieving messages, and which distributed storage devices 140 are unavailable (e.g., in the standby state or having left the distributed delivery network). The leader device may also manage storage of messages in the distributed storage devices 140 (e.g., manage redundancy of messages, etc.) and maintain an index of messages stored in the distributed storage devices 140 for retrieval. The leader device may broadcast changes in the device state table and message index, and follower devices may each maintain a separate copy of the device state table and message index. Thus, if a follower device becomes the leader (e.g., based on consensus election or if the leader enters the standby state, etc.), the new leader will have updated copies of the device state table and message index.

Figure 6:
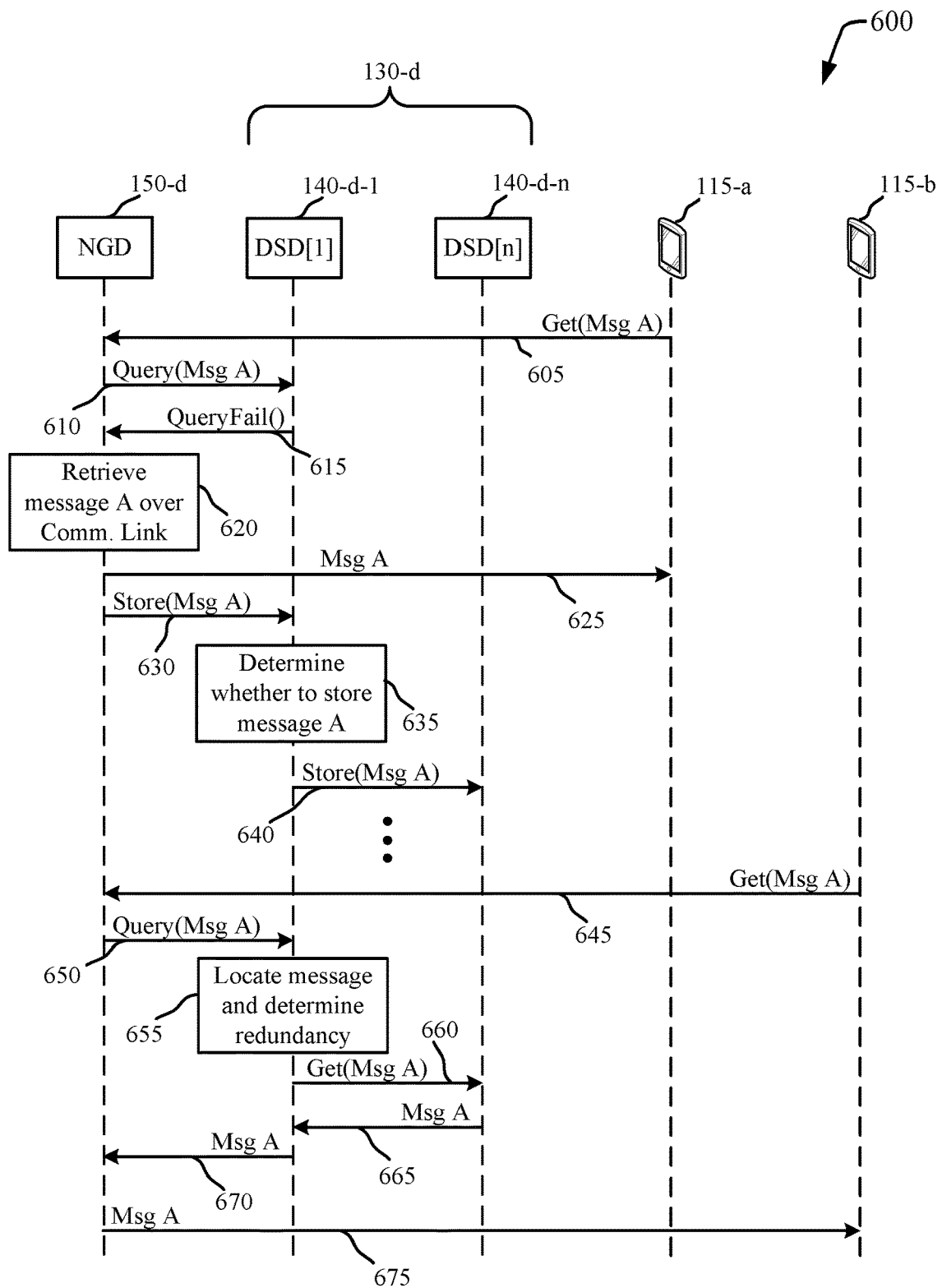
FIG. 6 shows a flow diagram of an example message flow for capacity enhancement of network access service in accordance with various aspects of the disclosure.

FIG. 6 shows a flow diagram 600 of an example message flow for capacity enhancement of network access service in accordance with various aspects of the disclosure. Flow diagram 600 illustrates message flow between a network gateway device 150-*d*, distributed storage devices 140-*d*-1 and 140-*d*-*n* of distributed delivery network 130-*d*, and communication devices 115. While network gateway device 150-*d* may provide network access service for a number of communication devices 115, only communication devices 115-*a* and 115-*b* are shown in flow diagram 600 for clarity. Flow diagram 600 may illustrate, for example, message flow in the communications environments 100, 200, or 300 of FIGS. 1-3.

Communication device 115-*a* may send a request 605 for message A. Message A may be, for example, a file or object that is part of video streaming programming (e.g., HTTP live streaming (HLS) file, etc.) requested from a content server of a network (e.g., network 120 of FIGS. 1-3). The network gateway device 150-*d* may send a query 610 to distributed delivery network 130-*d* to see if message A has been stored in the distributed delivery network 130-*d*.

Distributed storage device 140-*d*-1 may currently be acting as the leader device for distributed delivery network 130-*d*. In some examples, distributed storage device 140-*d*-1 may identify itself as the leader device to network gateway device 150-*d* and network gateway device 150-*d* may communicate query 610 directly to distributed storage device 140-*d*-1. Alternatively, network gateway device 150-*d* may broadcast query 610 to distributed delivery network 130-*d* (e.g., over a SAN, etc.), and the leader device (e.g., distributed storage device 140-*d*-1) may respond for the distributed delivery network 130-*d*.

Distributed storage device 140-*d*-1 may determine (e.g., based on the message index for distributed delivery network 130-*d*) that message A is not stored in distributed delivery network 130-*d*. Distributed storage device 140-*d*-1 may send an indication 615 to network gateway device 150-*d* that message A is not stored in distributed delivery network 130-*d*. Network gateway device 150-*d* may then retrieve message A over a shared communications link (e.g., shared communication links 110 of communications environments 100, 200, or 300 of FIGS. 1-3) at 620, and may deliver message A to communications device 115-*a* at 625.

Network gateway device 150-*d* may also send message A to distributed delivery network 130-*d* at 630. Acting as the leader device for distributed delivery network 130-*d*, distributed storage device 140-*d*-1 may determine if message A should be stored in distributed delivery network 130-*d*. If distributed storage device 140-*d*-1 determines that message A should be stored at 635, distributed storage device 140-*d*-1 may send message A to distributed storage device 140-*d*-*n* at 640 and may update the message index accordingly. Determining whether message A should be stored at 635 may be based on a message type for message A (e.g., determining that message A is a type of message for which a local copy can be delivered in response to a subsequent request, etc.).

Subsequently, communication device 115-*b* may send a request 645 for message A. The network gateway device 150-*d* may send a query 650 to distributed delivery network 130-*d* to see if message A has been stored in the distributed delivery network 130-*d*. At 655, distributed storage device 140-*d*-1 may locate message A in distributed storage device 140-*d*-*n*. In some cases, a content provider may also be involved in determining that a message is stored in the distributed delivery network 130-*d*. For example, where a content provider has pre-loaded or pushed content to the distributed delivery network 130-*d*, the content provider may send an index to the content in response to the request from the communication device 115-*b*, and distributed storage device 140-*d*-1 may locate the content based on the content provider index.

Distributed storage device 140-*d*-1 may determine that distributed storage device 140-*d*-*n* is available for message retrieval (e.g., in the active state, etc.) and request message A from distributed storage device 140-*d-n* at 660. Message A may be received from distributed storage device 140-*d-n* at 665. Distributed storage device 140-*d*-1 may provide message A to network gateway device 150-*d* at 670, and network gateway device 150-*d* may provide message A to communication device 115-*b* at 675, which may appear to communication device 115-*b* as having come from the content server from which message A was requested.

Distributed storage device 140-*d*-1 may also determine redundancy for message A at 655. Determining redundancy for message A at 655 may include determining how many copies of message A should be stored in distributed delivery network 130-*d* and where to store the copies. Message redundancy may be performed according to a storage policy that is based on frequency of requests for message A. For example, distributed storage device 140-*d*-1 (as the leader device) may compare the number of requests (e.g., over a given time, etc.) for message A against one or more thresholds to determine the redundancy of storage of message A in distributed delivery network 130-*d*. For example, for messages that have been requested only once, a single copy of the message may be stored in distributed delivery network 130-*d* (e.g., no redundancy). For messages that have been requested a first number of times greater than a first threshold, two instances of the message may be stored in two different locations (e.g., on different distributed storage devices 140-*d*, etc.) in distributed delivery network 130-*d*. Additional thresholds may defined and associated with additional levels of redundancy, up to and including storing the message on each distributed storage device 140-*d*.

Figure 7:
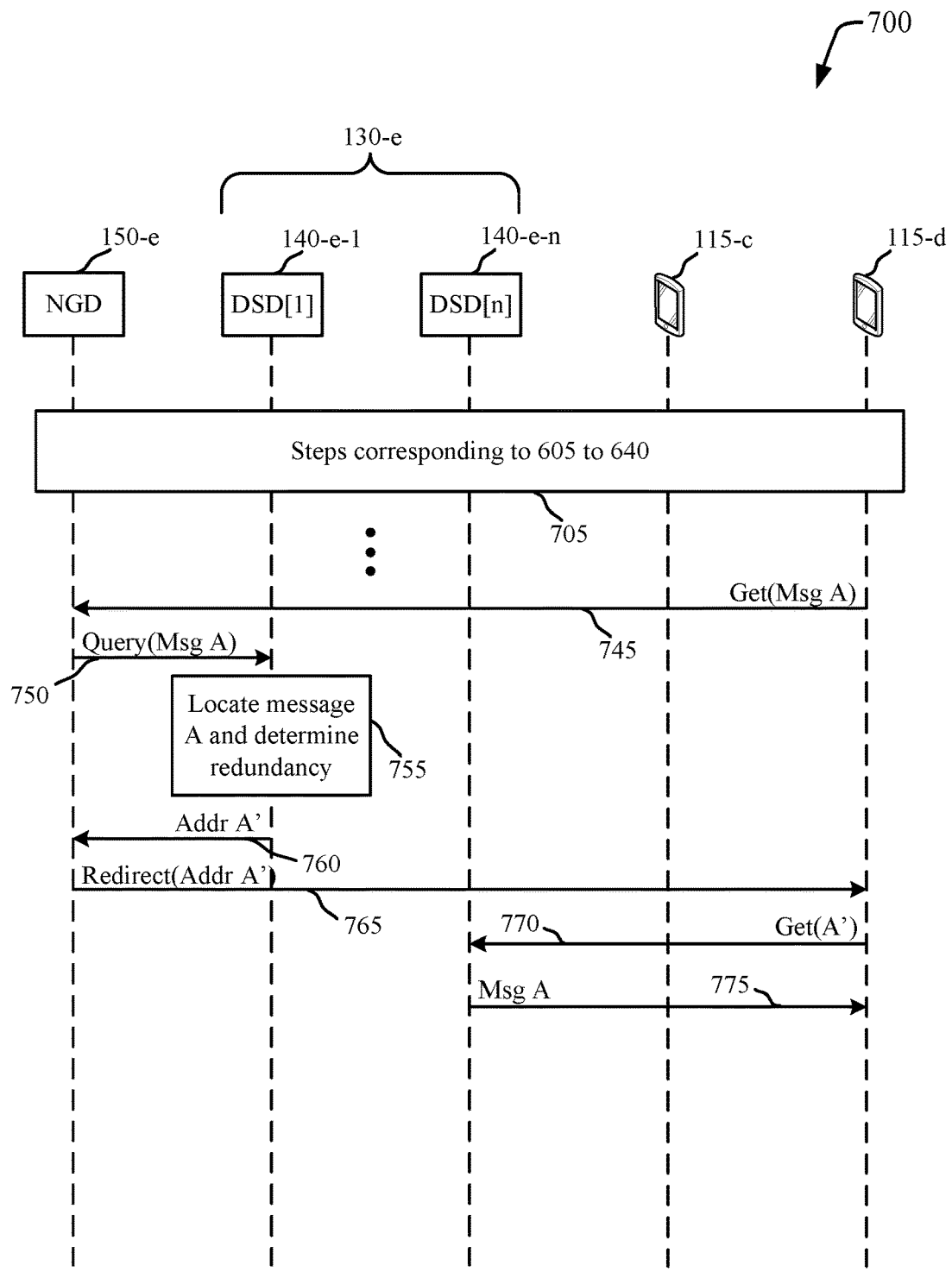
FIG. 7 shows a flow diagram of an example message flow for capacity enhancement of network access service in accordance with various aspects of the disclosure.

FIG. 7 shows a flow diagram 700 of an example message flow for capacity enhancement of network access service in accordance with various aspects of the disclosure. Flow diagram 700 illustrates message flow between a network gateway device 150-*e*, distributed storage devices 140-*e*-1 and 140-*e-n* of distributed delivery network 130-*e*, and communication devices 115. While network gateway device 150-*e* may provide network access service for a number of communication devices 115, only communication devices 115-*c* and 115-*d* are shown in flow diagram 700 for clarity. Flow diagram 700 may illustrate, for example, message flow in the communications environments 100, 200, or 300 of FIGS. 1-3.

Block 705 of flow diagram 700 may include message flow actions corresponding to steps 605 to 640 of flow diagram 600 of FIG. 6. For example, block 705 may include one or more requests for message A from communication devices 115, and message A may be stored at least in distributed storage device 140-*e-n*.

Subsequently, communication device 115-*d* may send a request 745 for message A. The network gateway device 150-*e* may send a query 750 to distributed delivery network 130-*e* to see if message A has been stored in the distributed delivery network 130-*e*. At 755, distributed storage device 140-*e*-1 (e.g., acting as leader device) may locate message A in distributed storage device 140-*e-n* at 755. Distributed storage device 140-*e*-1 may also determine redundancy for message A at 755, as described above with reference to block 655 of FIG. 6.

Distributed storage device 140-*e*-1 may determine that distributed storage device 140-*e-n* is available for message retrieval (e.g., in the active state, etc.) and may provide a proxy address A' 760 for message A at distributed storage device 140-*e-n*. Network gateway device 150-*d* may send a redirect message 765 for message A to communication device 115-*d*, which may then request message A from distributed storage device 140-*e-n* using the proxy address A' at 770. Distributed storage device 140-*e-n* may provide message A to communication device 115-*d* at 775.

While FIGS. 6 and 7 illustrate one of the distributed storage devices 140 acting as the leader device for distributed delivery networks 130, the network gateway device 150 may instead act as the leader device. For example, the network gateway device 150 may monitor the operational states of the distributed storage devices 140, manage storage and redundancy of messages in the distributed storage devices 140 and maintain an index of messages stored in the distributed storage devices 140 for retrieval.

As discussed above, distributed storage devices 140 may broadcast status messages to the other distributed storage devices 140 in the distributed delivery network 130. For example, distributed storage devices 140 may announce entry into (e.g., upon power-on or error recovery) and exit from (e.g., unrecoverable error conditions, etc.) the distributed delivery network 130 and may periodically broadcast a status or "heartbeat" message that confirms the device is operational. Distributed storage devices 140 may also broadcast other information such as bad sectors, environmental conditions, and the like.

The leader device of a distributed delivery network (e.g., the distributed delivery networks 130 of FIG. 1-3, 6 or 7) may maintain a device state table with current operational states of all distributed storage devices 140. FIG. 8 shows a diagram of an example device state table 800 in accordance with various aspects of the disclosure. Device state table 800 includes entries 805 for each distributed storage device 810 in a distributed delivery network (e.g., the distributed delivery networks 130 of FIG. 1-3, 6 or 7). For each device 810, the device state table 800 includes device status information 820 and may include other information 830 such as bad sectors for each device.

The leader device may receive broadcast status information (e.g., status messages, heartbeat messages, etc.) from each distributed storage device 140 and update device state table 800 accordingly. The leader may then (e.g., periodically, upon update, etc.) broadcast the values from device state table 800, which may be mirrored in the follower devices in case the leader becomes unavailable and one of the follower devices becomes the leader.

As discussed above, the leader device may be selected in a variety of ways. For example, leader priority may be statically defined, or the leader may dynamically selected using peer-to-peer communication between distributed storage devices 140. In some examples, the leader device is elected by a consensus operation of the distributed storage devices 140 currently in the active state.

Figure 9:
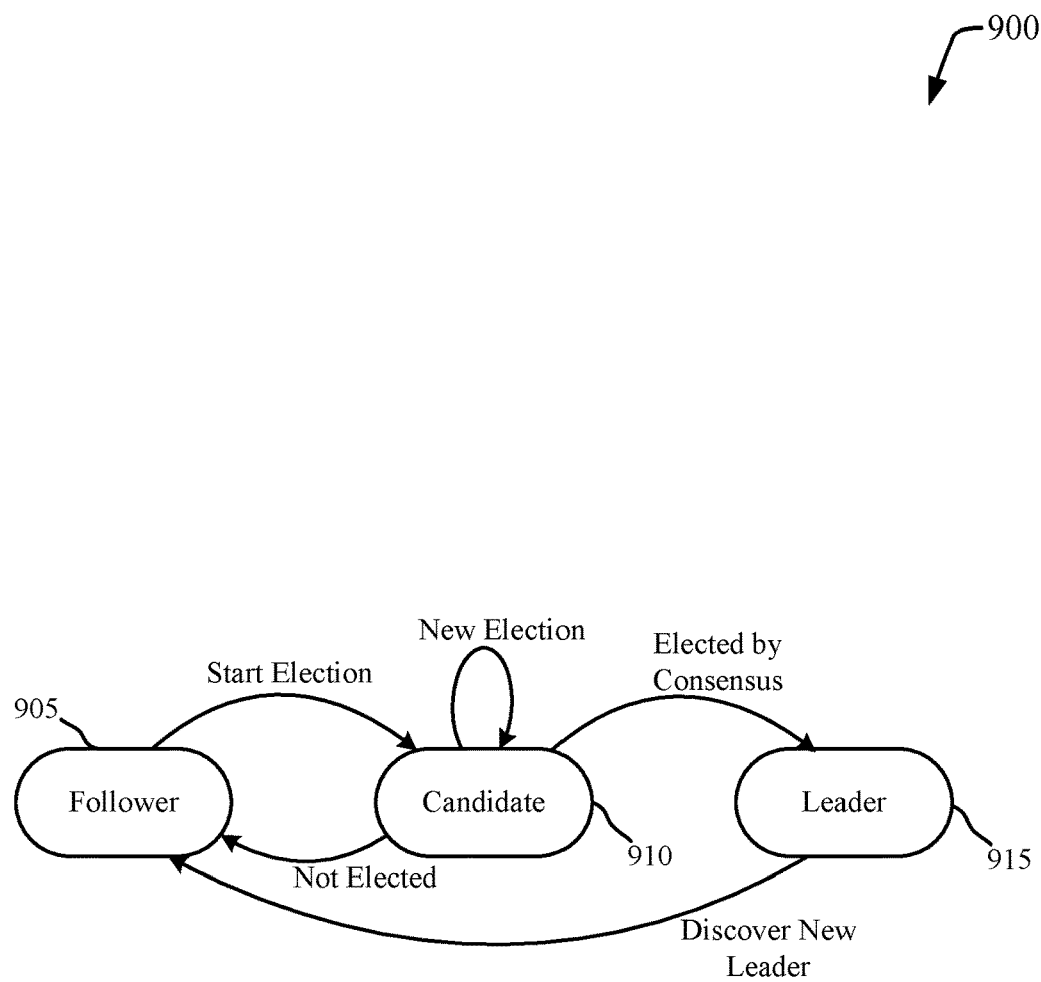
FIG. 9 shows an example dynamic leader selection state diagram for a distributed delivery network in accordance with various aspects of the disclosure.

FIG. 9 shows an example dynamic leader selection state diagram 900 for a distributed delivery network in accordance with various aspects of the disclosure. Dynamic leader selection state diagram 900 may be used, for example, by a distributed storage device 140 operating on the distributed delivery networks 130 of FIG. 1-3, 6 or 7.

At initial startup, the distributed storage device 140 may be initialized as a follower 905. Election cycles may be performed on a periodic basis. Upon the next election cycle, the follower 905 may be a candidate 910 for leader. The election may be conducted according to a consensus algorithm (e.g., Paxos, Multi-Paxos, Raft, etc.). If the candidate 910 is elected by the consensus algorithm, the candidate will be the leader 915 until the leader 915 discovers a new leader and returns to being a follower 905. If the leader becomes unavailable (e.g., transitions to the standby state, etc.) the leader may force an election, removing itself from being a candidate 910. In some examples, the consensus algorithm may result in a statistical sharing of the operations associated with being the leader device. Because the leader device may see heavier use than other devices, multiplexing the leader device operations may reduce failure rates for the components of the distributed storage devices 140 (e.g., HDD failure rates, etc.).

Figure 10:
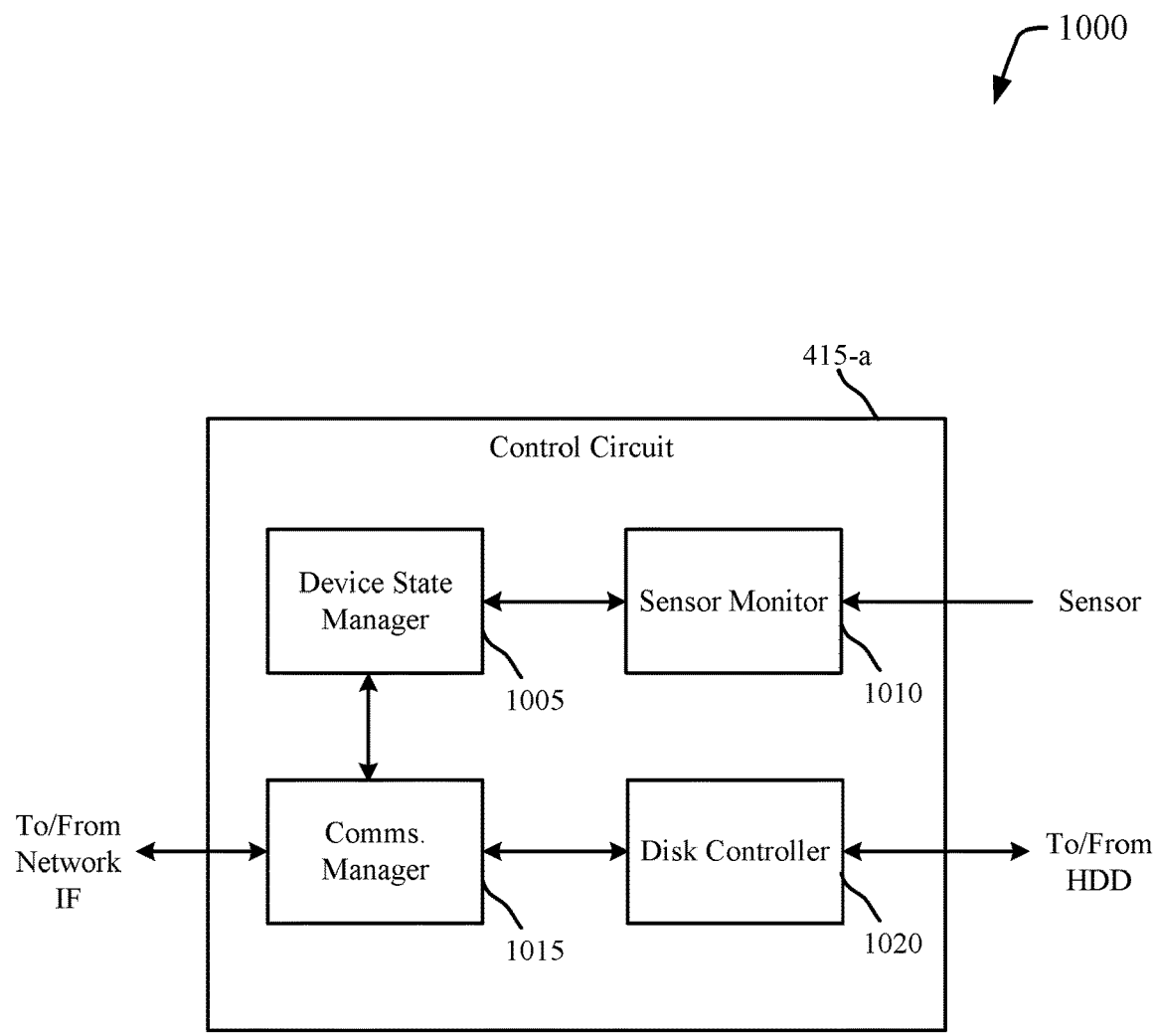
FIG. 10 shows a block diagram of a control circuit for a distributed storage device in accordance with various aspects of the disclosure.

FIG. 10 illustrates a block diagram 1000 of a control circuit 415-*a* for a distributed storage device in accordance with various aspects of the disclosure. The control circuit 415-*a* may illustrate, for example, aspects of control circuit 415 of FIG. 4. The control circuit 415-*a* includes device state manager 1005, sensor monitor 1010, communications manager 1015, and disk controller 1020. Each of these components may be in communication with each other, directly or indirectly.

The sensor monitor 1010 may perform functions associated with receiving sensor data and processing the sensor data (e.g., filtering, comparing sensor data with thresholds, etc.). The sensor monitor 1010 may provide information to the device state manager 1005 indicating whether the environmental conditions are safe or adverse for a rotating disk storage device of the distributed storage device.

Device state manager 1005 may manage operational states for the distributed storage device. For example, the device state manager 1005 may receive information from the sensor monitor 1010 relating to the current environmental conditions of the distributed storage device. If the sensor monitor 1010 indicates that the current environmental conditions are adverse for operation of a rotating disk storage device of the distributed storage device, the device state manager 1005 may transition the distributed storage device from an active state to a standby state. The device state manager 1005 may send a notification of the state transition (e.g., via communications manager 1015). The device state manager 1005 may perform other operations for device state transitions described above with reference to FIG. 5.

The disk controller 1020 may perform operations associated with storing and retrieving messages from the rotating disk storage device. Additionally, the disk controller 1020 may perform operations for securing the rotating disk storage device if the distributed storage device enters the standby state because of adverse environmental conditions. For example, when the distributed storage device enters the standby state, the disk controller 1020 may configure the rotating disk storage device in a protected state such as a parked media state, a deactivated state, or an unpowered state.

Figure 11:
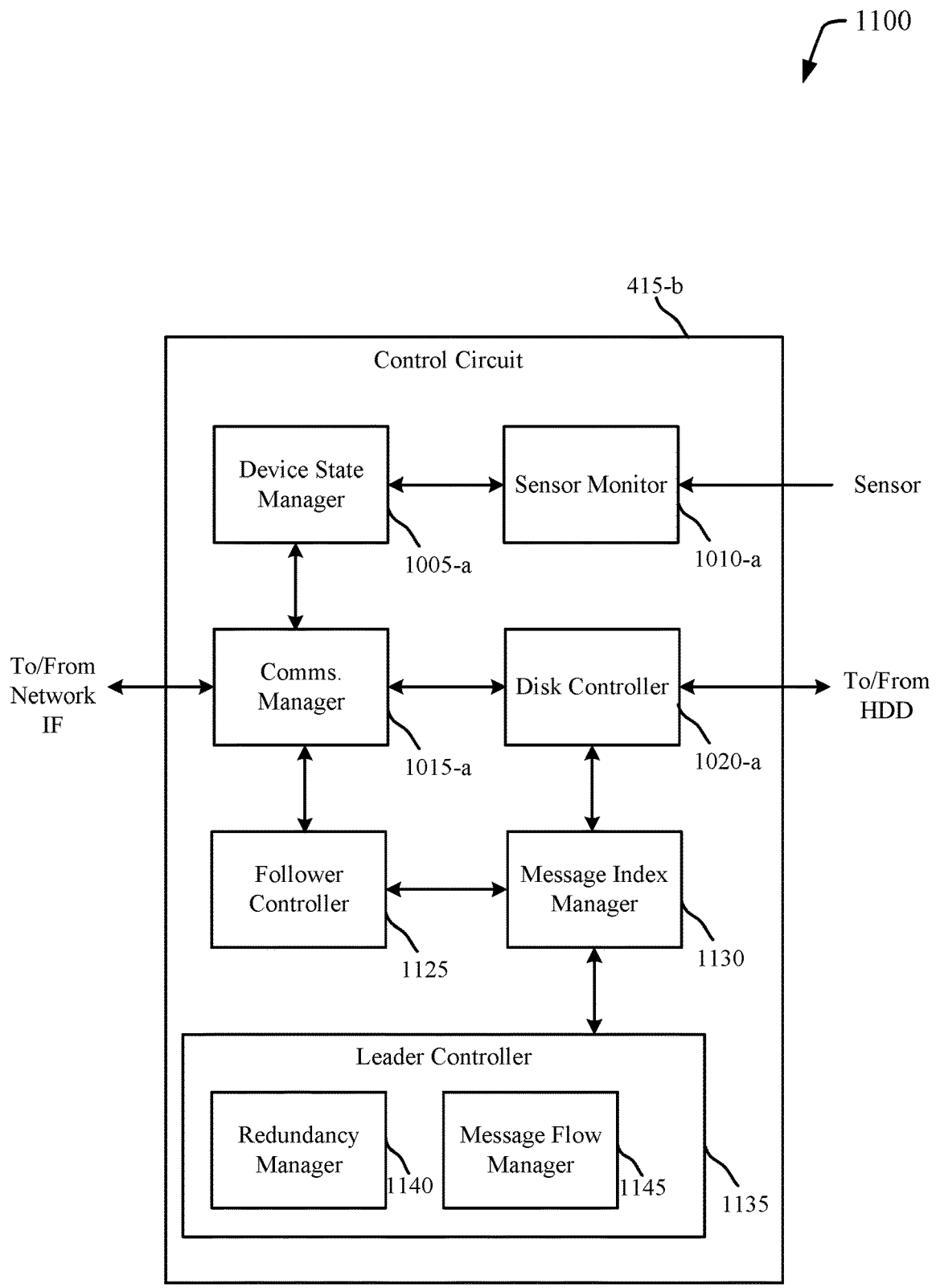
FIG. 11 shows a block diagram of a control circuit for a distributed storage device in accordance with various aspects of the disclosure.

FIG. 11 illustrates a block diagram 1100 of a control circuit 415-*b* for a distributed storage device in accordance with various aspects of the disclosure. The control circuit 415-*b* may illustrate, for example, aspects of control circuits 415 of FIG. 4 or FIG. 10. The control circuit 415-*b* includes device state manager 1005-*a*, sensor monitor 1010-*a*, communications manager 1015-*a*, disk controller 1020-*a*, follower controller 1125, message index manager 1130, and leader controller 1135. Each of these components may be in communication with each other, directly or indirectly. Device state manager 1005-*a*, sensor monitor 1010-*a*, communications manager 1015-*a*, and disk controller 1020-*a* may perform the functions of device state manager 1005, sensor monitor 1010, communications manager 1015, disk controller 1020 of FIG. 10, respectively.

Follower controller 1125 may control functions related to device state table and message index updates when the distributed storage device is operating as a follower device in the distributed delivery network. For example, follower controller 1125 may receive updates to the device state table and message index and update the corresponding entries (e.g., via message index manager 1130, etc.). Follower controller 1125 may also manage participation of the distributed storage device in the dynamic selection of leader devices (e.g., consensus election process as described above with reference to FIG. 9, etc.).

Leader controller 1135 may control functions related message flow and maintaining the operational state table and message index when the distributed storage device is operating as the leader device in the distributed delivery network. For example, leader controller 1135 may include message flow manager 1145, which may receive requests for messages (e.g., from a network gateway device 150, etc.), determine if the requested messages are stored in the distributed delivery network (e.g., based on the message index, etc.), and retrieve and deliver stored messages in response to the requests. Additionally or alternatively, message flow manager 1145 may forward a proxy address of the stored messages for redirection to the stored messages.

Leader controller 1135 may also monitor for periodic status messages from distributed storage devices of the distributed delivery network and update the operational state table if any of the distributed storage devices have not sent the periodic status messages or have otherwise indicated themselves as unavailable (e.g., transition to standby mode, etc.). Additionally, leader controller 1135 may update the message index to indicate that instances of messages stored at unavailable storage nodes are unavailable.

Leader controller 1135 may include redundancy manager 1140, which may manage redundancy for messages in distributed delivery network. For example, if a number of requests for a given stored message exceeds a threshold, redundancy manager 1140 may increase redundancy for the message. Leader controller 1135 may forward the message to a different distributed storage device for redundant storage of the message. Redundancy manager 1140 may determine redundancy levels using multiple thresholds based on the non-uniform probability density of messages. For example, redundancy manager 1140 may determine a storage policy for redundancy of messages by optimizing an information rate provided by the distributed delivery network based on the non-uniform probability density of messages and parameters of the distributed delivery network (e.g., number of distributed storage devices, total storage, reliability metrics of the distributed storage devices, etc.). Alternatively, redundancy manager 1140 may determine the storage policy as a normalized curve fit (e.g., linear, log-linear, polynomial) of the non-uniform probability density of messages or by using heuristic approaches providing a quasi-optimal information rate (e.g., gradient ascent, monte carlo, simulating annealing, etc.).

The components and modules of control circuits 415 of FIG. 4, 10 or 11 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

Figure 12:
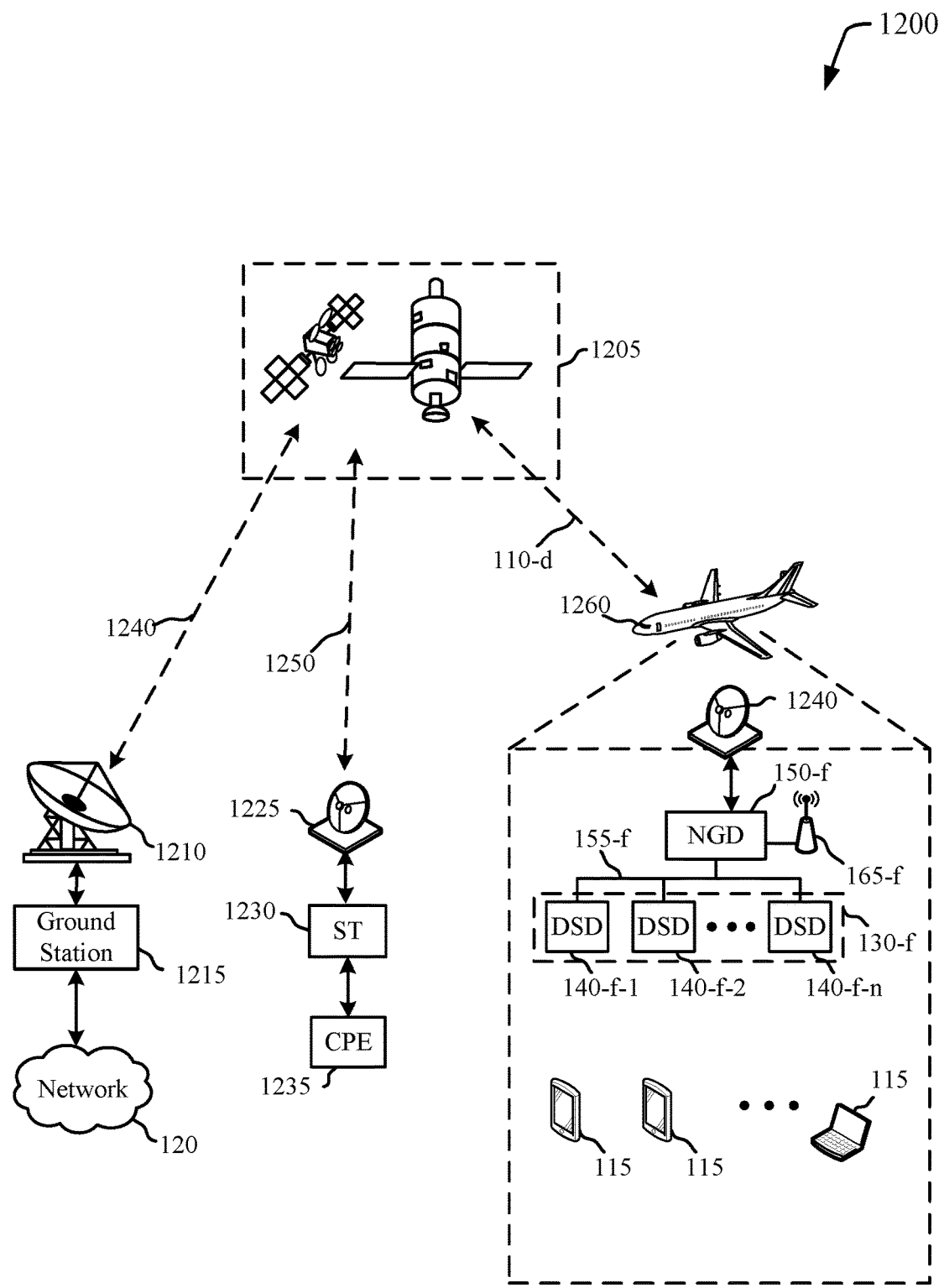
FIG. 12 shows a simplified diagram of an example satellite communications system which may implement capacity enhancement using a distributed delivery network in accordance with various aspects of the disclosure.

FIG. 12 shows a simplified diagram of an example satellite communications system 1200 which may implement capacity enhancement using a distributed delivery network in accordance with various aspects of the disclosure. The satellite communication system 1200 includes a satellite 1205 (or multiple satellites 1205), a ground station 1215, a ground station antenna system 1210, and a network gateway device 150-*f*. In operation, the satellite communication system 1200 provides network access service via the network gateway device 150-*f* to multiple communication devices 115. For example, the satellite communication system 1200 may provide for two-way communications between the network gateway device 150-*f* and a network 120 via the satellite 1205 and the ground station 1215. The communication devices 115 may be connected to the network gateway device 150-*f* via one or more access points 165-*f* (e.g., WAPs 165, etc.).

The satellite or satellites 1205 may include any suitable type of communication satellite. In some examples, some or all of the satellites may be in geostationary orbits. In other examples, any appropriate orbit (e.g., medium earth orbit (MEO), low earth orbit (LEO), etc.) for satellite 1205 may be used. In one embodiment, the satellite 1205 operates in a multi-beam mode, transmitting a number (e.g., typically 20-150, etc.) of spot beams each directed at a different region of the earth. This can allow coverage of a relatively large geographical area and frequency re-use within the covered area. Spot beams for communication with subscribers may be called service beams while spot beams for communication with gateways such as ground station 1215 may be called feeder beams. In embodiments, the service beams are fixed location spot beams, meaning that the angular beam width and coverage area for each service beam does not intentionally vary with time.

The ground station 1215 sends and receives signals to and from the satellite 1205 via communication link 1240 using the ground station antenna system 1210. The ground station antenna system 1210 may be two-way capable and designed with adequate transmit power and receive sensitivity to communicate reliably with the satellite 1205. The ground station 1215 is connected to the one or more networks 120, which may be the networks discussed with reference to FIGS. 1-3.

The network gateway device 150-*f* may use an antenna 1240 to communicate signals with the satellite 1205 via the communication link 110-*d*. The antenna 1240 may be mounted to an elevation and azimuth gimbal which points the antenna 1240 (e.g., actively tracking) at satellite 1205. The satellite communications system 1200 may operate in the International Telecommunications Union (ITU) Ku, K, or Ka-bands, for example from 17.7 to 21.2 Giga-Hertz (GHz). Alternatively, satellite communications system 1200 may operate in other frequency bands such as C-band, X-band, S-band, L-band, and the like. As illustrated in FIG. 12, network gateway device 150-*f* and antenna 1240 are mounted on an aircraft 1260. However, network gateway device 150-*f* and antenna 1240 may be used in other applications besides onboard the aircraft 1260, such as onboard boats, vehicles, or a stationary location where network access service is desired (e.g., a business, a school, etc.), in some cases.

The satellite communications system 1200 may also include one or more subscriber terminals 1230, which may also be provided network access service via satellite 1205 and ground station 1215. Each subscriber terminal 1230 is located within at least one service beam and is capable of two-way communication with the satellite 1205 via an antenna 1225. Each subscriber terminal 1230 may be connected with (e.g., may provide network access service for) one or more customer devices 1235 (e.g., desktop computers, laptops, set-top boxes, smartphones, tablets, Internet-enabled televisions, and the like). These customer devices 1235 may also be known as customer premises equipment (CPE).

Typically, satellite communications system 1200 may have a fixed capacity based on a system bandwidth and a number of spot beams for frequency re-use. While that capacity may be allocated to subscriber terminals 1230 and mobile devices 115 in a variety of ways, it may not always be possible to provide a high data rate to all subscriber terminals 1230 and mobile devices 115 at the same time via signals transmitted over the satellite links 110-*d* and 1250.

In embodiments, the satellite system 1200 is configured to provide a high-quality network access experience to mobile devices 115 by increasing the capacity of the communications system 1200 using a distributed delivery network 130-*f* as described above. The distributed delivery network 130-*f* may include multiple distributed storage devices 140 (e.g., distributed storage devices 140-*f*-1, 140-*f*-2, 140-*f*-*n*, etc.) that store messages requested by mobile devices 115 for delivery to other mobile devices in response to subsequent requests. The distributed storage devices 140 may be connected to the network gateway device 150-*f* and each other via a network 155-*f* (e.g., SAN 155-*f*, etc.). The distributed delivery network 130-*f* may perform the functions described above for distributed delivery networks 130 of FIG. 1-3, 6 or 7, which are not repeated here for the sake of brevity.

Figure 13:
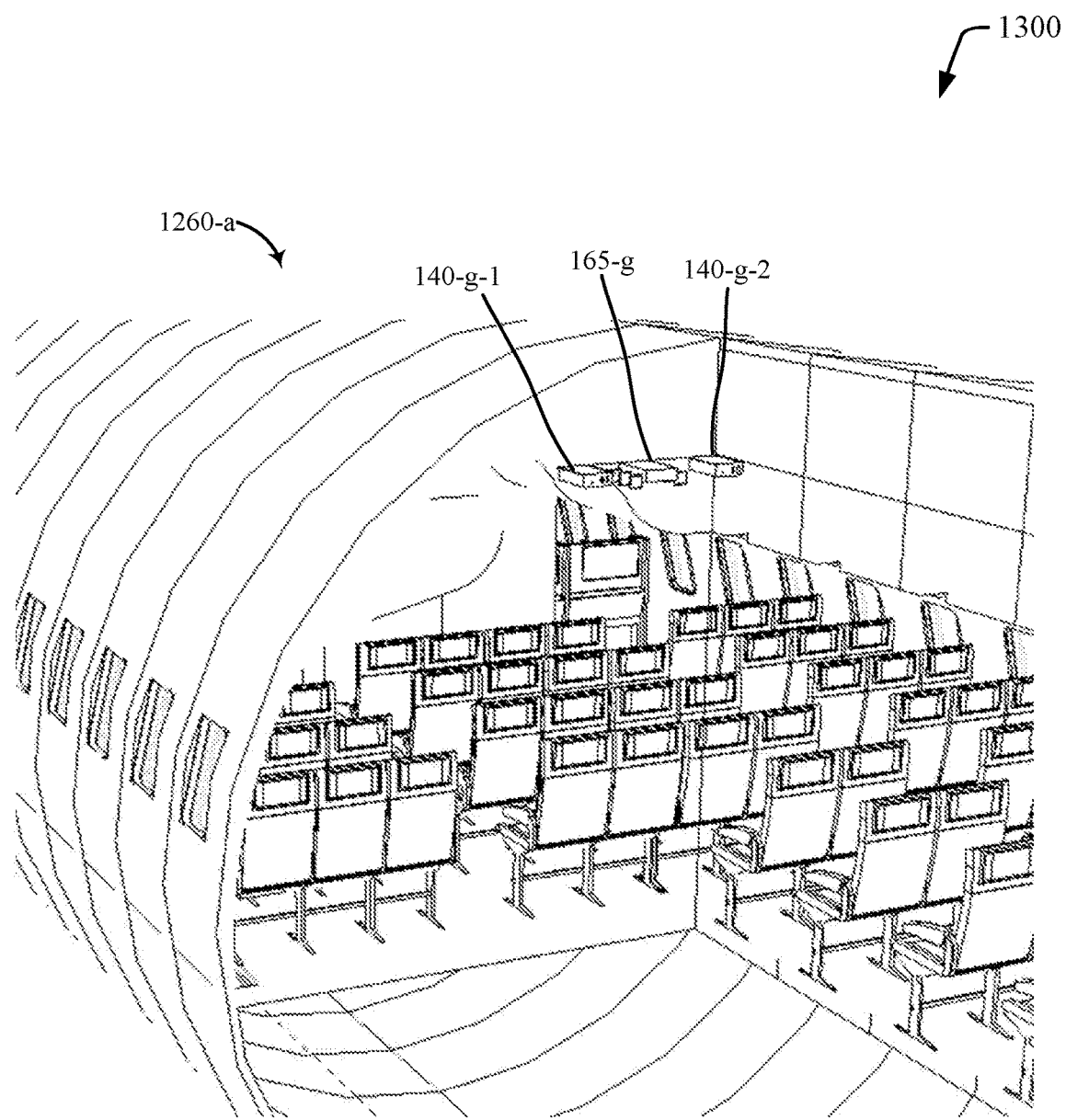
FIG. 13 shows a diagram illustrating example locations for installation of distributed storage devices on an aircraft in accordance with various aspects of the disclosure.

As discussed above, distributed storage devices 140 may be distributed throughout a mobile environment such as aircraft 1260. FIG. 13 shows a diagram 1300 illustrating example locations for installation of distributed storage devices 140 on an aircraft 1260-*a* in accordance with various aspects of the disclosure. In diagram 1300, distributed storage devices 140-*g*-1 and 140-*g*-2 are located in the roof of the cabin of the aircraft 1260-*a*, above the interior paneling, which is generally removable for access. Distributed storage devices 140-*g*-1 and 140-*g*-2 may be located near WAP 165-*g*, and may be connected to a network gateway device 150 (not shown) on aircraft 1260-*a* via wired or wireless connections (e.g., via WAP 165-*g*, etc.). For simplicity diagram 1300 illustrates only two distributed storage devices 140-*g*, however, it should be understood that additional distributed storage devices 140-*g* may be distributed in other locations throughout aircraft 1260-*a*.

In some cases, locating distributed storage devices 140 in various locations throughout aircraft 1260-*a* may provide for higher tolerance of environmental conditions such as turbulence because different portions of aircraft 1260-*a* may experience turbulence in different manners. For example, as an aircraft experiences shock, pitch, or yaw movement, different portions of the aircraft have different trajectories. In addition, an aircraft fuselage may experience flex, which may result in different levels of shock or vibration at different locations within the aircraft cabin. By distributing the distributed storage devices 140-*g* throughout the aircraft 1260-*a* where the local environmental conditions can vary significantly, the capacity enhancement provided by the network of distributed storage devices 140-*g* can be relatively robust. In other words, although the capacity enhancement can change over time as individual distributed storage devices 140-*g* autonomously transition between active and standby states, the variance in local environmental conditions reduces the likelihood that all or most of them will transition into the standby state at the same time.

Figure 14:
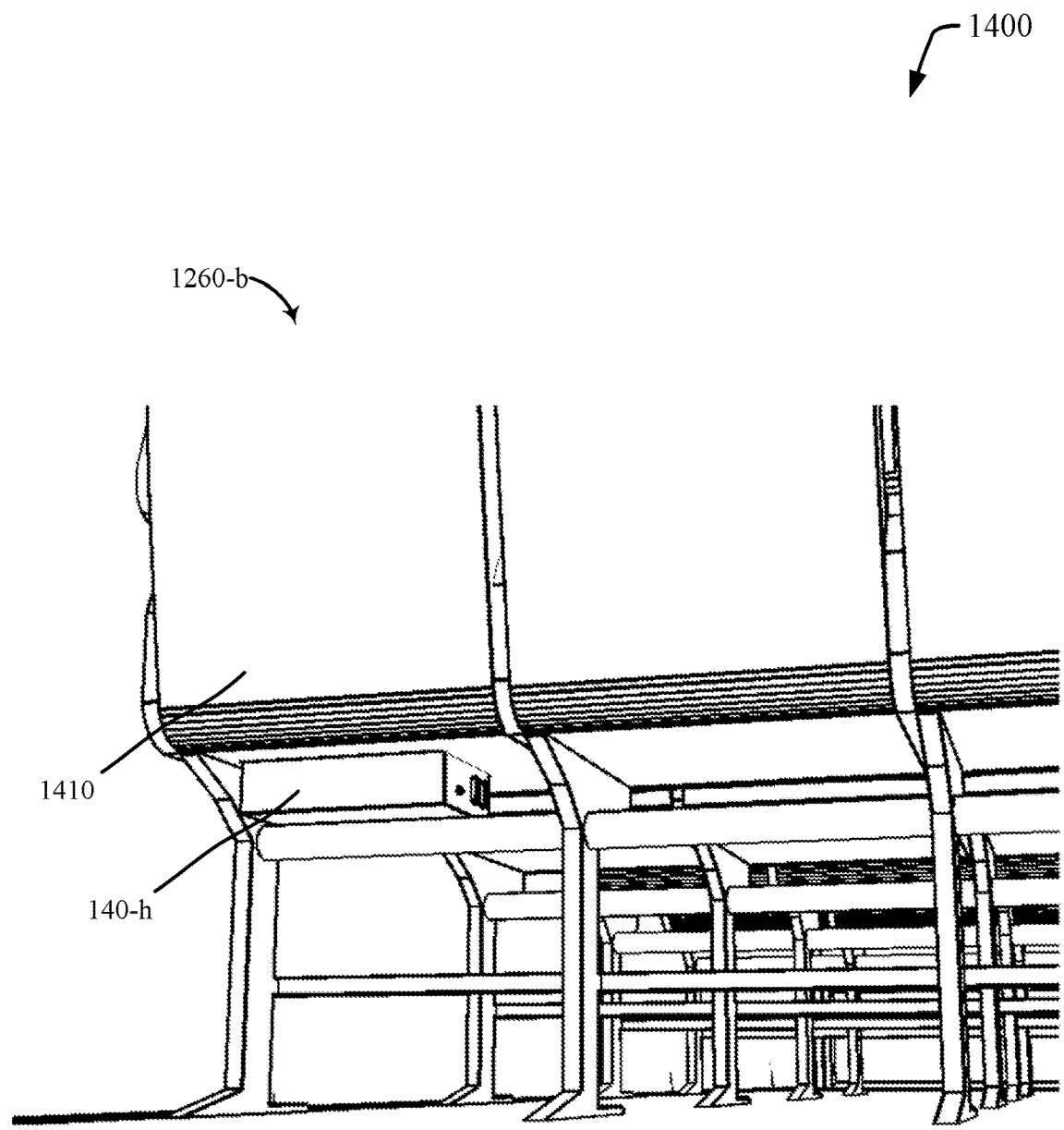
FIG. 14 shows a diagram illustrating alternative example locations for installation of distributed storage devices on an aircraft in accordance with various aspects of the disclosure.

FIG. 14 shows a diagram 1400 illustrating alternative example locations for installation of distributed storage devices 140 on an aircraft 1260-b in accordance with various aspects of the disclosure. In diagram 1400, distributed storage device 140-h is located underneath seat 1410 in the cabin of aircraft 1260-b. Distributed storage device 140-h may be connected to a network gateway device 150 (not shown) on aircraft 1260-b via wired or wireless connections (e.g., via a WAP 165, etc.). For simplicity, diagram 1400 illustrates only one distributed storage devices 140-h, however, it should be understood that additional distributed storage devices 140-g may be distributed in similar locations throughout aircraft 1260-b. In addition, a system may use the illustrated locations for distributed storage devices 140 of diagrams 1300 and 1400 in combination, as well as additional locations within an aircraft 1260.

In some embodiments, distributed storage devices 140 include quick-release features to allow for replacement of non-functional distributed storage device 140 (e.g., due to failure of the rotating disk storage device, etc.). For example, the distributed storage devices 140 may include a housing with a fitting mounted to the housing for coupling with an external bracket mounted to the aircraft. A release lever may be coupled with the fitting to release the fitting from the external bracket. The distributed delivery network 130 may indicate (e.g., via a network gateway device 150, etc.) distributed storage devices 140 that are to be replaced by sending messages to a service center. A technician may retrieve the information and replace the distributed storage devices 140 when servicing the aircraft. The non-functional distributed storage devices 140 may be refurbished (e.g., by installing a new rotating disk storage device, etc.) for future use.

Figure 15:
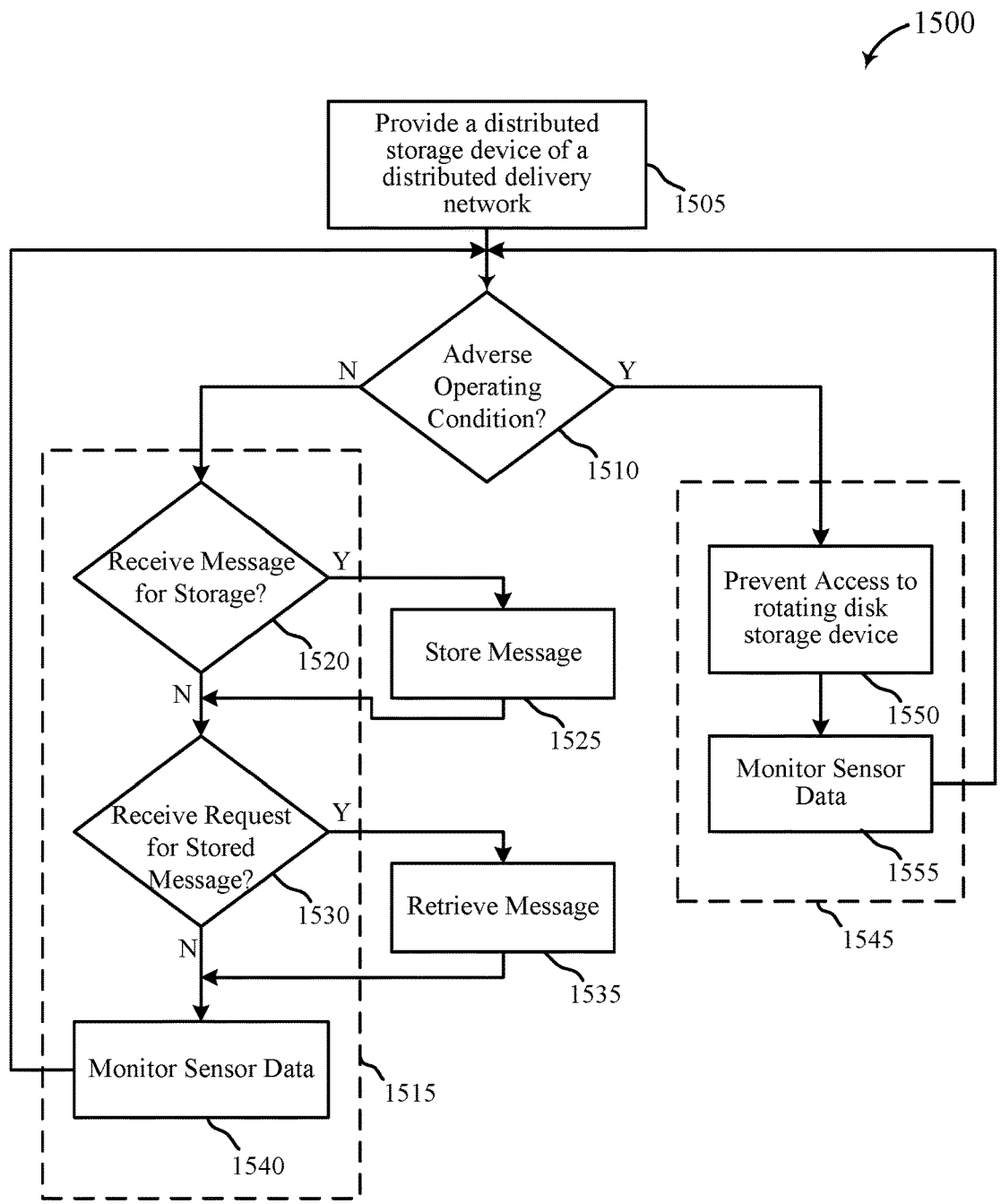
FIG. 15 shows a flowchart diagram of an example method for capacity enhancement of network access service in accordance with various aspects of the disclosure.

FIG. 15 shows a flowchart diagram of an example method 1500 for capacity enhancement of network access service in accordance with various aspects of the disclosure.

At block 1505 of method 1500, a distributed storage device of a communications system may be provided. The communications system may include, for example, multiple distributed storage devices coupled to a network gateway device. For example, the distributed storage devices 140 may be implemented in a distributed delivery network 130 as described above with reference to FIG. 1-3, 6, 7 or 12.

At block 1510, the distributed storage device may detect whether an adverse operating condition for a rotating disk storage device of the distributed storage device is present based on a sensor signal from a sensor of the distributed storage device indicating a characteristic of an environment of the distributed storage device. If an adverse operating condition is not present (e.g., the operating conditions are determined to be safe for the rotating disk storage device), the distributed storage device may stay in or transition to the active state 1515.

In the active state 1515, the distributed storage device may provide access to the rotating disk storage device for operations of the distributed delivery network. For example, at block 1520 a message may be received for storage in the distributed storage device and the distributed storage device may store the message at block 1525. The distributed storage device may receive a request for the stored message at block 1530 and may retrieve and provide the message in response to the request at block 1535. The request for the message received at block 1530 may, for example, be for redundancy of storage within other distributed storage devices of the distributed delivery network (e.g., based on a request from a leader device or the network gateway device, based on a frequency of requests for the given stored message, etc.).

The distributed storage device may continue to monitor the sensor signal in the active state 1515 at block 1540, and determine whether adverse operating conditions exist at block 1510. Based on detection of an adverse operating condition at block 1510, the distributed storage device may transition to the standby state 1545. Upon transitioning to the standby state 1545, the distributed storage device may transmit (e.g., broadcast, etc.) an indication that the distributed storage device is unavailable to other devices of the distributed delivery network.

In the standby state 1545, the distributed storage device may prevent access to the rotating disk storage device at block 1550. For example, the distributed storage device may configure the rotating disk storage device in a protected state (e.g., parked media state, deactivated, unpowered, etc.). In the standby state 1545, the distributed storage device may continue to monitor the sensor signal at block 1555, and determine whether the adverse operating conditions still exist at block 1510.

Figure 16:
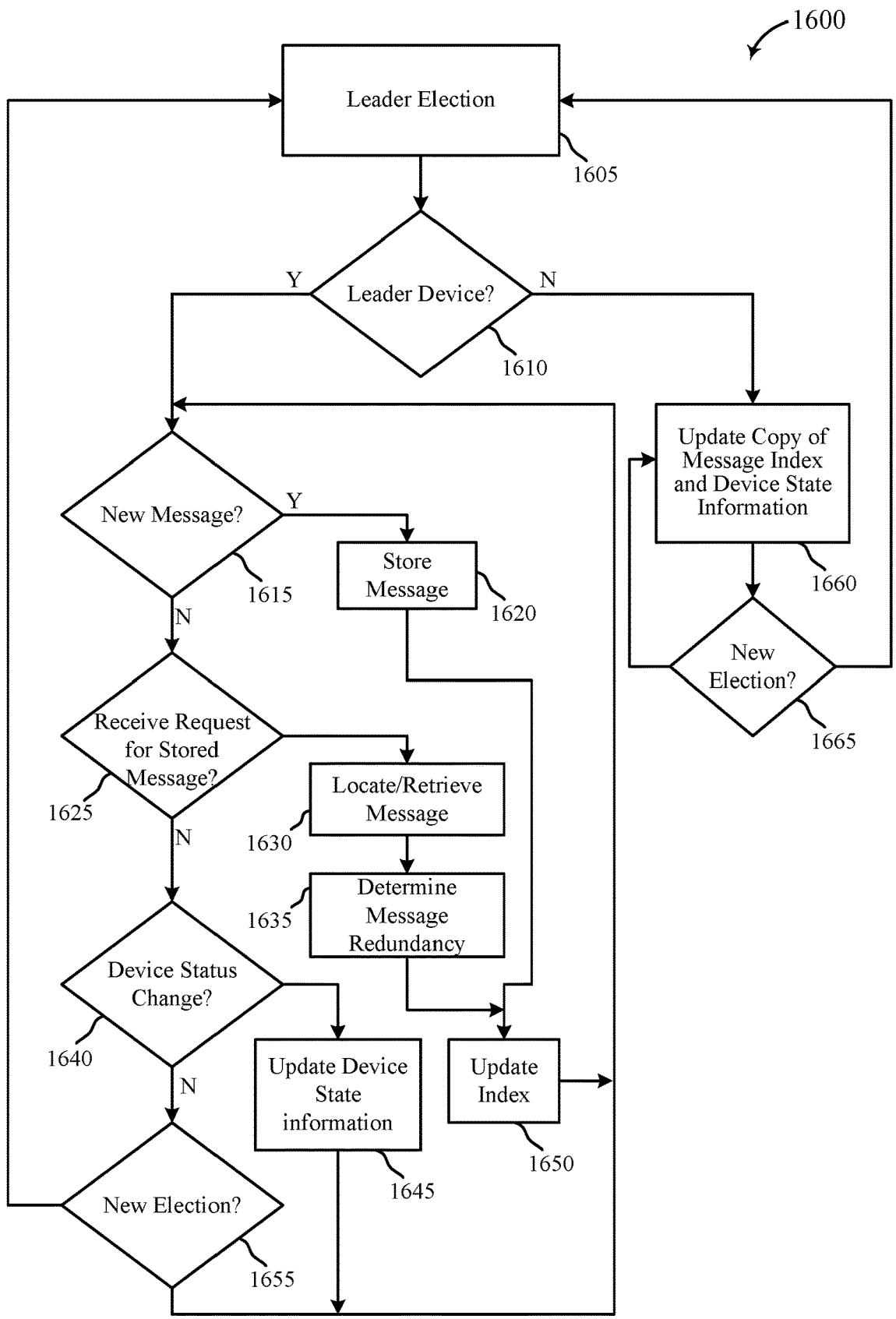
FIG. 16 shows a flowchart diagram of an example method for capacity enhancement of network access service in accordance with various aspects of the disclosure.

FIG. 16 shows a flowchart diagram of an example method 1600 for capacity enhancement of network access service in accordance with various aspects of the disclosure. The method may be performed, for example, by a distributed storage device 140 as described above with reference to FIGS. 1-15.

At block 1605, an election may determine a leader for a distributed delivery network. The consensus election may be performed periodically, be event driven (e.g., the leader becomes unavailable, etc.), and may be conducted according to a consensus algorithm (e.g., Paxos, Multi-Paxos, Raft, etc.).

If, at block 1610, the distributed storage device 140 determines that it is the leader device as a result of the election at block 1605, the distributed storage device 140 may perform functions associated with the leader device at blocks 1615-1655. For example, the leader device may identify a new message for storage in the distributed delivery network at block 1615 and store the message in one of the distributed storage devices 140 at block 1620. The leader device may receive a request for a stored message at block 1625, and may locate the requested stored message at block 1630. The leader device may retrieve the message, or may provide a proxy address for the requested stored message at block 1630, in some cases.

At block 1635, the leader device may determine message redundancy for the message. Determining redundancy for the message may include determining how many copies of the message should be stored in the distributed delivery network 130 and where to store the copies. Determining the redundancy may be based on a frequency of requests for the message, and may include multiple different levels of redundancy corresponding to multiple request thresholds as discussed above. The leader device may send the stored message to additional distributed storage devices based on the determined redundancy level.

After storing the message in one or more distributed storage devices at blocks 1620 or 1635, the leader device may update the message index at block 1650. The leader device may broadcast updates to the message index to the distributed storage devices for maintenance of back-up copies of the message index.

The leader device may monitor the status of other distributed storage devices at block 1640. For example, the leader device may monitor for status messages from the follower devices and update an operational state table including entries and status conditions (e.g., active or standby state, etc.) of the other distributed storage devices.

The leader device may also track other information such as bad sectors for each of the distributed storage devices. The leader device may broadcast the operational state table to the distributed storage devices for maintenance of back-up copies of the operational state table. The leader device may determine that a new election cycle is occurring at block 1655 and return to block 1610 to determine if it is still the leader device.

If, at block 1610, the distributed storage device is not the leader device for the current election cycle, the distributed storage device may perform the functions of a follower device in blocks 1660-1665. For example, the follower device may receive broadcast information at block 1660 including updates for the message index and operational state table, and may maintain a copy of the message index and operational state table. The follower device may determine that a new election cycle is occurring at block 1665 and return to block 1610 to determine if it will become the leader device. As a follower device, the distributed storage device may continue to perform the functions for sensor monitoring, state management, message storage, and message retrieval described with respect to FIG. 15.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Processors may perform the necessary tasks. Features implementing functions may also be physically located at various positions, including being distributed such that portions of functions are implemented at different physical locations.

Furthermore, embodiments may be implemented by hardware, software, firmware, middleware, microcode, hardware description languages, or combinations thereof. When implemented in software, firmware, middleware or microcode, the program code or code segments to perform the necessary tasks may be stored in a computer-readable medium such as a storage medium. A computer-readable medium may include, for example, RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. A method, comprising:
providing a plurality of distributed devices on a first network within a mobile environment, wherein a network access service is provided to a plurality of user devices within the mobile environment via a shared communication link of a satellite communication system between the first network and a second network that is external to the mobile environment, wherein the plurality of distributed devices are coupled with the second network via the shared communication link and provide communication of messages associated with the plurality of user devices, and wherein at least two distributed devices of the plurality of distributed devices are located at different locations within the mobile environment;
determining that a first distributed device of the plurality of distributed devices is operating as a leader device for the plurality of distributed devices; and
operating the first distributed device as the leader device, the operating comprising:
determining, at the first distributed device, a communication data flow to be provided by the plurality of distributed devices for one or more messages, the one or more messages requested by at least one user device of the plurality of user devices for communication via the shared communication link; and
sending at least one message to a second distributed device of the plurality of distributed devices to control communication of the one or more messages according to the determined communication data flow.

2. The method of claim 1, wherein the operating further comprises:
monitoring for periodic status messages from the plurality of distributed devices; and
determining that communication of one or more second messages via the second distributed device is unavailable based upon not receiving a periodic status message from the second distributed device.

3. The method of claim 2, further comprising:
broadcasting a device state table indicating the unavailability of the second distributed device to the plurality of distributed devices.

4. The method of claim 1, the further comprising:
receiving a request for a first message from a first user device of the plurality of user devices;
determining that the first message can be communicated via the second distributed device of the plurality of distributed devices; and
providing the first message to the first user device in response to the request.

5. The method of claim 1, further comprising:
determining that the first distributed device is no longer operating as the leader device for the plurality of distributed devices;
monitoring broadcast messages for indications of an updated communication data flow for the one or more messages; and
communicating the one or more messages according to the updated communication data flow.

6. The method of claim 1, wherein the communication data flow comprises a redundancy of storage for the one or more messages.

7. The method of claim 1, wherein the determining that the first distributed device is operating as the leader device for the plurality of distributed devices is based on a result of a consensus election by at least a subset of the plurality of distributed devices.

8. The method of claim 1, wherein the at least one message comprises a request for retrieval of the one or more messages from the second distributed device.

9. The method of claim 1, wherein the operating further comprises:
monitoring message flow for the plurality of user devices via the shared communication link.

10. The method of claim 1, wherein the plurality of distributed devices are coupled to the plurality of user devices via a plurality of access points of the first network.

11. A communications system comprising:
a plurality of distributed devices on a first network within a mobile environment, wherein a network access service is provided to a plurality of user devices within the mobile environment via a shared communication link of a satellite communication system between the first network and a second network that is external to the mobile environment, wherein the plurality of distributed devices are coupled with the second network via the shared communication link and provide communication of messages associated with the plurality of user devices, and wherein at least two distributed devices of the plurality of distributed devices are located at different locations within the mobile environment, each distributed device of the plurality of distributed devices comprising:
a control circuit to determine that the each distributed device is operating as a leader device for the plurality of distributed devices, the control circuit further to, when the each distributed device is operating as the leader device:
determine, at the each distributed device, a communication data flow to be provided by the plurality of distributed devices for one or more messages, the one or more messages requested by at least one user device of the plurality of user devices for communication via the shared communication link; and
send at least one message to a second distributed device of the plurality of distributed devices to control communication of the one or more messages according to the determined communication data flow.

12. The communications system of claim 11, the control circuit further to, when the each distributed device is operating as the leader device:
monitor for periodic status messages from the plurality of distributed devices; and
determine that communication of one or more second messages via the second distributed device is unavailable based upon not receiving a periodic status message from the second distributed device.

13. The communications system of claim 12, the control circuit further to, when the each distributed device is operating as the leader device:
broadcast a device state table indicating the unavailability of the second distributed device to the plurality of distributed devices.

14. The communications system of claim 11, the control circuit further to, when the each distributed device is operating as the leader device:
receive a request for a first message from a first user device of the plurality of user devices;
determine that the first message can be communicated via the second distributed device of the plurality of distributed devices; and
provide the first message to the first user device in response to the request.

15. The communications system of claim 11, the control circuit further to, when the each distributed device is operating as the leader device:
determine that the first distributed device is no longer operating as the leader device for the plurality of distributed devices;
monitor broadcast messages for indications of an updated communication data flow for the one or more messages; and
communicate the one or more messages according to the updated communication data flow.

16. The communications system of claim 11, wherein the communication data flow comprises a redundancy of storage for the one or more messages.

17. The communications system of claim 11, the control circuit further to determine that the each distributed device is operating as the leader device for the plurality of distributed devices based on a result of a consensus election by at least a subset of the plurality of distributed devices.

18. The communications system of claim 11, wherein the at least one message comprises a request for retrieval of the one or more messages from the second distributed device.

19. The communications system of claim 11, the control circuit further to, when the each distributed device is operating as the leader device:
monitor message flow for the plurality of user devices via the shared communication link.

20. The communications system of claim 11, wherein the plurality of distributed devices are coupled to the plurality of user devices via a plurality of access points of the first network.

* * * * *